(12) United States Patent
Choi et al.

(10) Patent No.: US 11,588,154 B2
(45) Date of Patent: Feb. 21, 2023

(54) POSITIVE ELECTRODE ACTIVE MATERIAL AND LITHIUM SECONDARY BATTERY COMPRISING THE SAME

(71) Applicant: ECOPRO BM CO., LTD., Cheongju-si (KR)

(72) Inventors: Moon Ho Choi, Cheongju-si (KR); Seung Woo Choi, Cheongju-si (KR); Jun Won Suh, Cheongju-si (KR); Jin Kyeong Yun, Cheongju-si (KR); Jung Han Lee, Cheongju-si (KR); Gwang Seok Choe, Cheongju-si (KR); Joong Ho Bae, Cheongju-si (KR); Du Yeol Kim, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 210 days.

(21) Appl. No.: 17/095,107

(22) Filed: Nov. 11, 2020

(65) Prior Publication Data
US 2021/0167380 A1 Jun. 3, 2021

(30) Foreign Application Priority Data

Nov. 29, 2019 (KR) .................. 10-2019-0156946
May 19, 2020 (KR) .................. 10-2020-0059446

(51) Int. Cl.
*H01B 1/08* (2006.01)
*H01M 4/525* (2010.01)
(Continued)

(52) U.S. Cl.
CPC ............ *H01M 4/525* (2013.01); *C01G 53/50* (2013.01); *H01B 1/08* (2013.01); *H01M 4/366* (2013.01);
(Continued)

(58) Field of Classification Search
CPC .. H01B 1/00; H01B 1/08; H01M 4/36; H01M 4/131; H01M 4/485; H01M 4/525; C01G 53/44
See application file for complete search history.

(56) References Cited

U.S. PATENT DOCUMENTS

2014/0158932 A1* 6/2014 Sun ................ H01M 4/505
252/182.1
2016/0049647 A1* 2/2016 Park ............... H01M 4/131
429/209
(Continued)

FOREIGN PATENT DOCUMENTS

EP 3828139 * 6/2021
JP 2019-169374 A 10/2019
(Continued)

OTHER PUBLICATIONS

Fengxia Xin et al.; "Li—Nb—O Coating/Substitution Enhances the Electrochemical Performance of the LiNi0.8Mn0.1Co0.1O2 (NMC 811) Cathode"; ACS Applied Materials & Interfaces 2019; Aug. 30, 2019; pp. 34889-34894; vol. 11; American Chemical Society; with supporting information (pp. S1-S8).

*Primary Examiner* — Mark Kopec
(74) *Attorney, Agent, or Firm* — Studebaker & Brackett PC

(57) ABSTRACT

The present invention relates to a positive electrode active material having improved electrical characteristics by adjusting an aspect ratio gradient of primary particles included in a secondary particle, a positive electrode including the positive electrode active material, and a lithium secondary battery using the positive electrode.

12 Claims, 15 Drawing Sheets

(51) Int. Cl.
*C01G 53/00* (2006.01)
*H01M 4/36* (2006.01)
*H01M 10/0525* (2010.01)
*H01M 4/02* (2006.01)

(52) U.S. Cl.
CPC ..... *H01M 10/0525* (2013.01); *C01P 2002/54* (2013.01); *C01P 2004/04* (2013.01); *C01P 2004/54* (2013.01); *C01P 2004/84* (2013.01); *C01P 2006/40* (2013.01); *H01M 2004/028* (2013.01)

(56) References Cited

U.S. PATENT DOCUMENTS

| | | | |
|---|---|---|---|
| 2016/0181597 A1* | 6/2016 | Kim | H01M 4/525 |
| | | | 429/223 |
| 2018/0233739 A1 | 8/2018 | Park et al. | |
| 2021/0057731 A1* | 2/2021 | Choi | H01M 10/0525 |

FOREIGN PATENT DOCUMENTS

| | | |
|---|---|---|
| KR | 10-2017-0063407 A | 6/2017 |
| KR | 10-2019-0008156 A | 1/2019 |
| WO | 2018/123951 A1 | 7/2018 |
| WO | 2019/013605 A1 | 1/2019 |
| WO | 2019/182153 A1 | 9/2019 |
| WO | WO 2020256473 A1 * | 12/2020 |

\* cited by examiner

POSITIVE ELECTRODE ACTIVE MATERIAL AND LITHIUM SECONDARY BATTERY COMPRISING THE SAME

CROSS-REFERENCE TO RELATED APPLICATION

This application claims priority to and the benefit of Korean Patent Application Nos. 10-2019-0156946, filed on Nov. 29, 2019, and 10-2020-0059446, filed on May 19, 2020, the disclosure of which is incorporated herein by reference in their entirety.

BACKGROUND

1. Field of the Invention

The present invention relates to a positive electrode active material having improved electrical characteristics by adjusting an aspect ratio gradient of primary particles included in a secondary particle, a positive electrode including the positive electrode active material, and a lithium secondary battery using the positive electrode.

2. Discussion of Related Art

Batteries store electrical power by using materials facilitating an electrochemical reaction at a positive electrode and a negative electrode. As a representative example of such batteries, there is a lithium secondary battery storing electrical energy due to a difference in chemical potential when lithium ions are intercalated/deintercalated into/from a positive electrode and a negative electrode.

The lithium secondary battery uses materials enabling reversible intercalation/deintercalation of lithium ions as positive electrode and negative electrode active materials, and is manufactured by charging an organic electrolyte solution or a polymer electrolyte solution between the positive electrode and the negative electrode.

A lithium composite oxide is used as a positive electrode active material of the lithium secondary battery, and composite oxides such as $LiCoO_2$, $LiMn_2O_4$, $LiNiO_2$, $LiMnO_2$, etc. are being studied.

Among the positive electrode active materials, $LiCoO_2$ is most widely used due to excellent lifetime characteristics and charge/discharge efficiency, but it is expensive because of the limited resource of cobalt, which is used as a raw material, and thus has a disadvantage of limited price competitiveness.

Lithium manganese oxides such as $LiMnO_2$ and $LiMn_2O_4$ have advantages of excellent thermal safety and low costs, but also have problems of small capacity and poor high-temperature characteristics. In addition, while a $LiNiO_2$-based positive electrode active material exhibits a battery characteristic such as a high discharge capacity, due to cation mixing between Li and a transition metal, it is difficult to synthesize the $LiNiO_2$-based positive electrode active material, thereby causing a big problem in rate characteristics.

In addition, depending on the intensification of such cation mixing, a large amount of Li by-products is generated, and since most of the Li by-products consist of compounds of LiOH and $Li_2CO_3$, they become a cause of gelation in preparation of a positive electrode paste and gas generation according to charge/discharge progression after the preparation of an electrode. Residual $Li_2CO_3$ increases the swelling phenomenon of a cell and thus reduces cycles and also leads to the swelling of a battery.

SUMMARY OF THE INVENTION

In the lithium secondary battery market, the growth of lithium secondary batteries for electric vehicles plays a leading role, and the demand for positive electrode materials used in lithium secondary batteries is also constantly changing.

For example, conventionally, in terms of securing safety, lithium secondary batteries using LFP have been mainly used. However, recently, the use of a nickel-based lithium composite oxide, which has a larger energy capacity per weight than LFP, is expanding.

In accordance with the trend of such positive electrode materials, the present invention is directed to providing to a positive electrode active material which has high energy density, an improved lifetime and improved stability.

Particularly, the present invention is directed to providing a positive electrode active material, which includes primary particles enabling lithium intercalation/deintercalation and secondary particles in which the primary particles are aggregated, wherein electrical characteristics are improved by adjusting an aspect ratio gradient or sphericity gradient of the primary particles included in the secondary particle.

In addition, the present invention is directed to providing a positive electrode including the positive electrode active material defined herein.

Furthermore, the present invention is directed to providing a lithium secondary battery, which uses the positive electrode defined herein.

The objects of the present invention are not limited to the above-mentioned objects (e.g., for electric cars), and other objects and advantages of the present invention which are not mentioned can be understood by the following description and more clearly understood by exemplary embodiments of the present invention. In addition, it will be readily apparent that the objects and advantages of the present invention may be realized by the means indicated by the claims and a combination thereof.

One aspect of the present invention provides a positive electrode active material, which includes primary particles enabling lithium intercalation/deintercalation and secondary particles formed by aggregating the primary particles.

Here, the primary particles included in the secondary particle may exhibit an aspect ratio gradient increasing from the core to the surface region of the secondary particle. That is, the average aspect ratio of the primary particles may have a gradient increasing from the core to the surface region of the secondary particle.

Here, by adjusting a gradient range of the average aspect ratio of the primary particles present in the core of the secondary particle and the average aspect ratio of the primary particles present in the surface region of the secondary particle, a decrease in lifetime characteristics of the positive electrode active material may be minimized, and other electrochemical characteristics (e.g., charge capacity, efficiency, output, etc.) may also be improved due to doping of metal elements such as niobium (Nb) in the positive electrode active material.

Particularly, according to the present invention, there may be a tendency for a difference between the average aspect ratio of all primary particles in the surface region of the secondary particle and the average aspect ratio of all primary particles in the core of the secondary particle to be reduced by increasing a mixing ratio of a metal dopant relative to a precursor to increase the content of the metal dopant in the primary particle or specifying a calcination (heat treatment) condition for a mixture of the precursor and the metal dopant in a process of preparing the positive electrode active material.

Therefore, since the primary particles and the secondary particles, which are included in the positive electrode active material, may satisfy the following conditions, and thus a particle density in the positive electrode active material may be improved. In addition, the electrochemical characteristics of the positive electrode active material may be improved.

In the positive electrode active material, when a distance from the core to the surface region of the secondary particle is R, a region where the distance from the core of the secondary particle is 4/5R to R is a first region ($R_1$), and a region where the distance from the core of the secondary particle is 0 to 2/5R is a second region ($R_2$), a ratio ($W_1/W_2$) of the average aspect ratio ($W_1$) of all primary particles in the first region and the average aspect ratio ($W_2$) of all primary particles in the second region is preferably less than 2.217.

In addition, the ratio ($W_1/W_2$) of the average aspect ratio ($W_1$) and the average aspect ratio ($W_2$) may be more than 1.280.

When the primary particles included in the secondary particle show an aspect ratio gradient increasing from the core region to the surface region of the secondary particle such that the average aspect ratio ($W_1$) of all primary particles in the first region and the average aspect ratio ($W_2$) of all primary particles in the second region have values within the above-mentioned range, a partial strain caused by asymmetric volume expansion during the charging/discharging of a lithium secondary battery manufactured using the positive electrode active material can be effectively reduced, thereby improving electrochemical characteristics.

Another aspect of the present invention provides a positive electrode including the positive electrode active material defined herein.

Still another aspect of the present invention provides a lithium secondary battery using the positive electrode defined herein.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
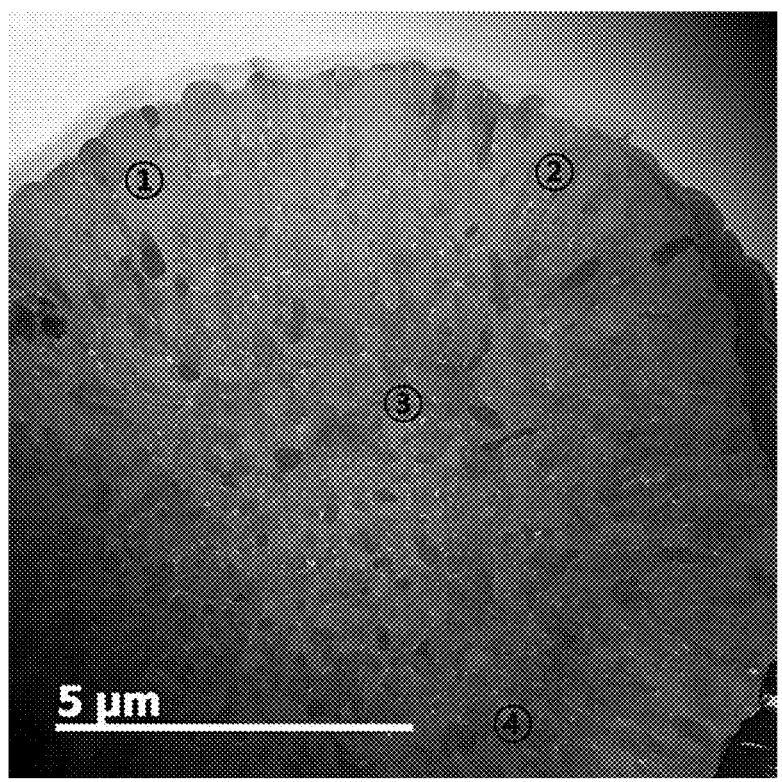
FIG. 1 is a cross-sectional TEM image of a positive electrode active material according to Example 1 of the present invention.
Figure 2:
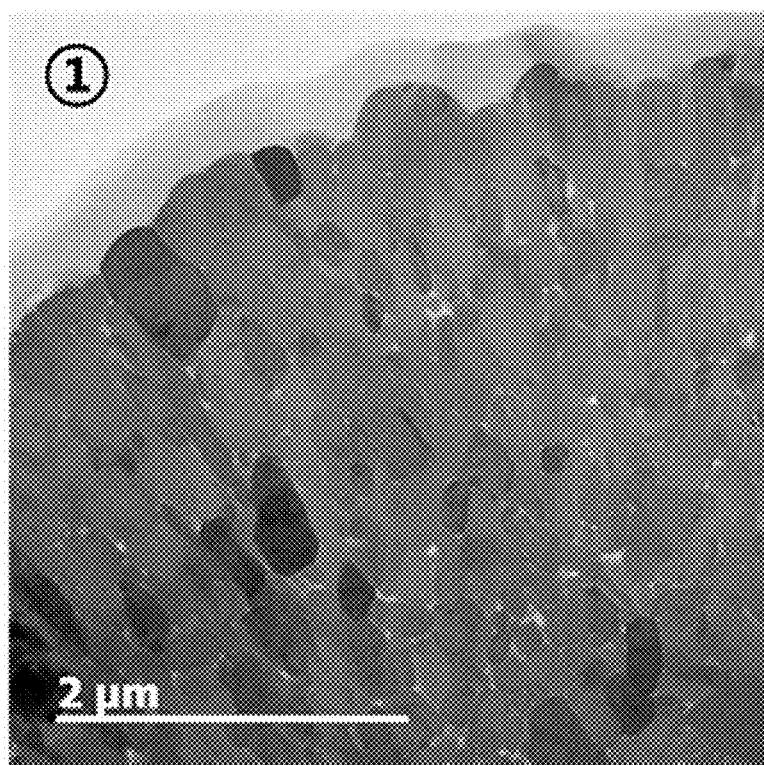
FIGS. 2 to 5 are partially enlarged images of a region shown in FIG. 1.
Figure 3:
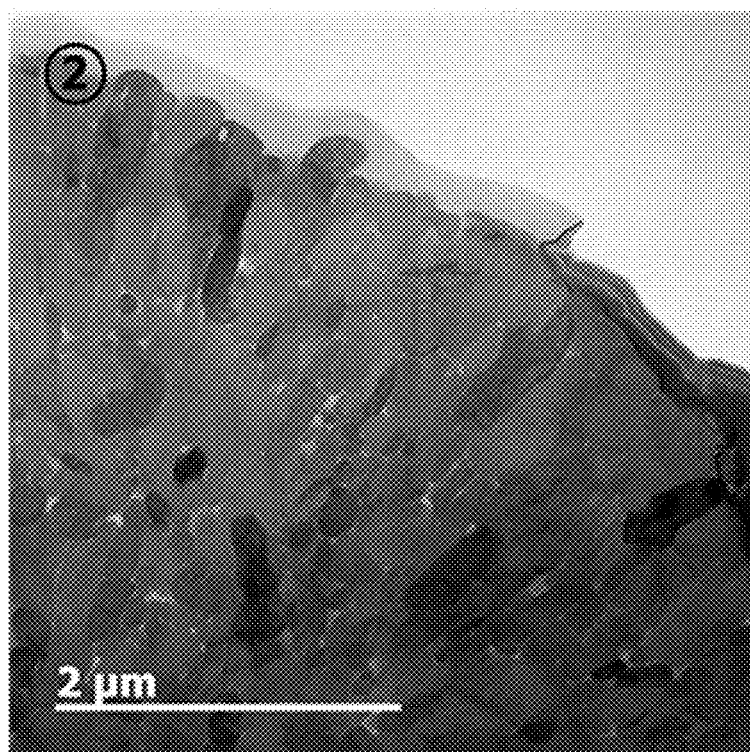
Figure 4:
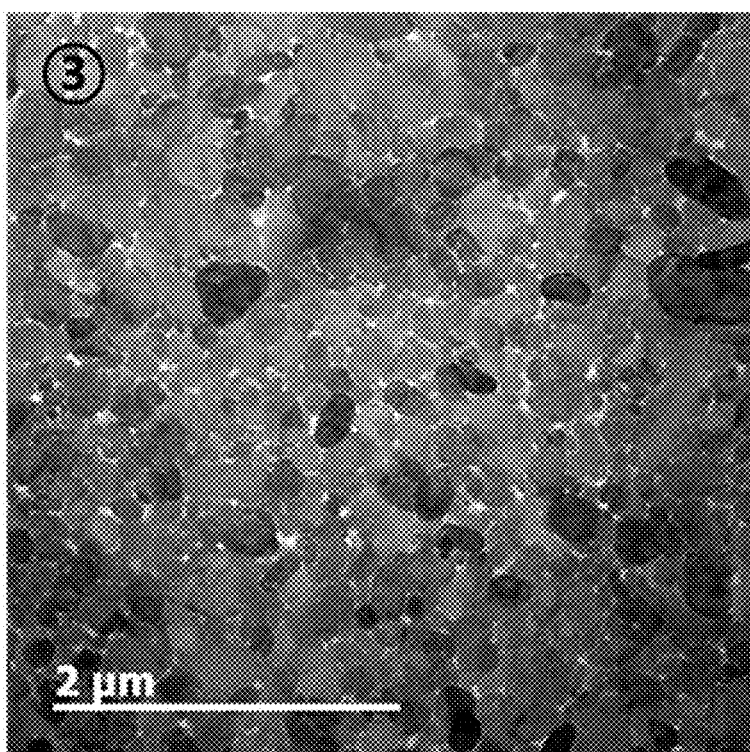
Figure 5:
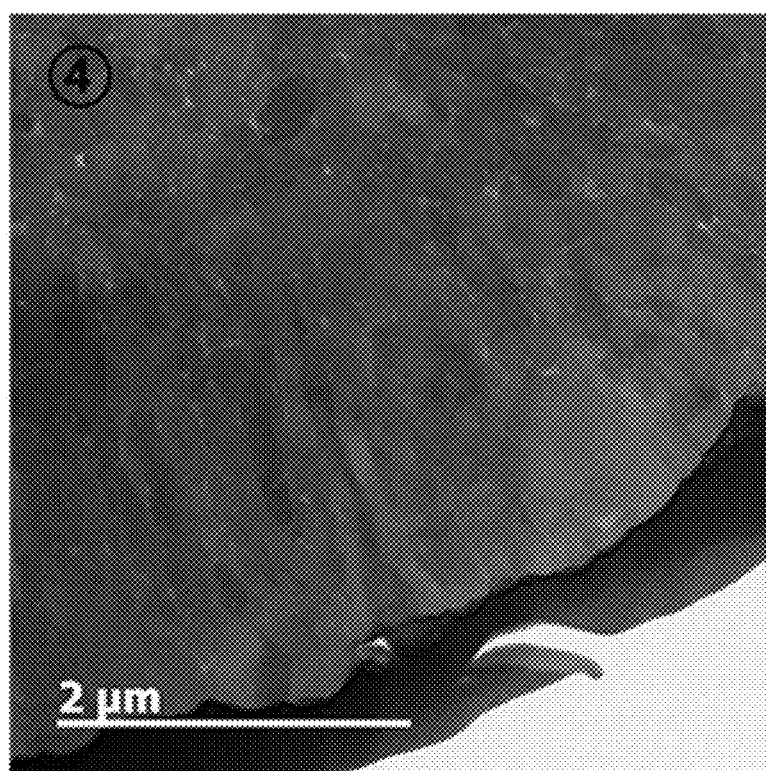

To facilitate a better understanding of the present invention, specific terms are defined in the present invention for convenience. Unless particularly defined otherwise, scientific and technical terms used herein will have meanings generally understood by those of ordinary skill in the art. In addition, it should be understood that, unless particularly indicated in the context, the singular forms include plural forms thereof, and the plural terms also include singular forms thereof.

Hereinafter, a positive electrode active material and a lithium secondary battery using a positive electrode including the positive electrode active material according to the present invention will be described in further detail.

Positive Electrode Active Material

According to one aspect of the present invention, a positive electrode active material including primary particles enabling lithium intercalation//deintercalation and secondary particles in which the primary particles are aggregated is provided.

Here, the primary particle means a grain or crystallite, and the secondary particle means an aggregate formed by aggregating a plurality of primary particles. There may be a void and/or grain boundary between the primary particles constituting the secondary particles.

In addition, the shape of the primary particle is not particularly limited, but preferably, the primary particle may have a shape satisfying an aspect ratio gradient range to be described below.

Generally, in the case of a positive electrode active material represented by the following Formula 1, as the primary particles have an aspect ratio gradient increasing from the core to the surface region of the secondary particle, a rod shape may be developed toward the surface region of the secondary particle. Accordingly, primary particles having a shape relatively close to a spherical shape are mainly present in the core of the secondary particle, whereas primary particles having a rod shape (an elongated shape extending to one direction) may be present in the surface region of the secondary particle.

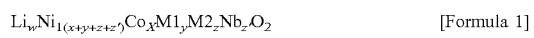

$Li_wNi_{1-(x+y+z+z')}Co_xM1_yM2_zNb_{z'}O_2$     [Formula 1]

(Here, M1 is at least one selected from Mn and Al,

M2 is at least one selected from P, Sr, Ba, B, Ti, Zr, Mn, Al, W, Ce, Hf, Ta, Cr, F, Mg, Cr, V, Fe, Zn, Si, Y, Ga, Sn, Mo, Ge, Nd, Gd and Cu, M1 and M2 are different elements, and $0.5 \leq w \leq 1.5$, $0 \leq x \leq 0.50$, $0 \leq y \leq 0.20$, $0 \leq z \leq 0.20$ and $0 \leq z' \leq 0.20$) However, according to the present invention, by adjusting the range of an aspect ratio gradient of the primary particles in the positive electrode active material, the primary particles present in the surface region of the secondary particle may also have a shape similar to the primary particles present in the core of the secondary particle, that is, a shape relatively close to a spherical shape, rather than a relatively rod shape.

More specifically, according to the present invention, the average aspect ratio of the primary particles has a gradient increasing from the core to the surface region of the secondary particle, and with the increase in content of a metal dopant in the primary particle, there may be a tendency for decreasing a difference between the average aspect ratio of all primary particles in the surface region of the secondary particle and the average aspect ratio of all primary particles in the core of the secondary particle.

Here, as the primary particles may have an average particle of 0.1 to 20 nm, preferably, 0.2 to 15 nm, and more preferably, 0.3 to 10 nm, the optimal density of a positive electrode manufactured using positive electrode active materials according to various embodiments of the present invention may be realized. In addition, the average diameter of the secondary particle may vary according to the average diameter and particle number of the aggregated primary particles, but may be present in the range of 0.1 to 25 m, preferably, 2 to 20 m, and more preferably, 3 to 15 m.

In one embodiment, the primary particles included in the secondary particle exhibit an aspect ratio gradient increasing from the core to the surface region of the secondary particle.

The term "aspect ratio" used herein is a length/width ratio of the major axis (length; a axis) and the minor axis (width; c axis) of the primary particle, and when the major axis indicates the direction of a relatively long region of the primary particle, the minor axis indicates the length of a relatively short region of the primary particle. Here, the minor axis may indicate the direction perpendicular to the major axis.

Accordingly, the overall shape of the primary particle may be determined by the major axis (a axis) and the length of the minor axis (c axis). For example, when the aspect ratio, which is a ratio of the major axis and the minor axis, of the primary particle is more than 5, the shape of the primary particle may be close to a relatively rod shape, rather than a spherical shape. Meanwhile, as the aspect ratio of the primary particle is close to 1, the shape of the primary particle will be close to a spherical shape.

That is, the aspect ratio of the primary particle may be used as an indicator of the sphericity of the primary particle, and it will be understood that as the aspect ratio of the primary particle is close to 1, the sphericity of the primary particle is greater.

In addition, when the primary particle present in the core of the secondary particle has a shape close to a spherical shape, and the size of an aspect ratio gradient of the primary particles increasing from the core of the secondary particle to the surface region of the secondary particle is small, it will be understood that the size of the sphericity gradient of the primary particles decreasing from the core of the secondary particle to the surface region of the secondary particle is small.

According to one embodiment of the present invention, the primary particle has an aspect ratio gradient increasing from the core of the secondary particle to the surface region of the secondary particle, and here, the size of the aspect ratio gradient satisfies a specific numerical range to be described. In addition, since the primary particles having the above-described aspect ratio gradient pattern are present radially from the core of the secondary particle, a strain caused by the volume expansion of the primary particle during charging/discharging can be effectively relieved. Therefore, it is possible to improve the lifetime and stability of a lithium secondary battery using the positive electrode active material.

In the embodiment, the primary particle may exhibit an aspect ratio gradient continuously increasing from the core of the secondary particle to the surface region of the secondary particle, but the present invention is not necessarily limited thereto.

That is, the aspect ratio of the primary particles increases from the core of the secondary particle to the surface region of the secondary particle, and the aspect ratio gradient of the primary particles may continuously or discontinuously increase depending on a method of defining the gradient.

Here, the primary particles and secondary particles included in the positive electrode active material may minimize a decrease in lifetime characteristics of the positive electrode active material due to doping of metal elements such as niobium (Nb) in the positive electrode active material and improve other electrochemical characteristics (e.g., charge capacity, efficiency, power, etc.) by at least adjusting a gradient range of the average aspect ratio of the primary particles present in the core of the secondary particle and the average aspect ratio of the primary particles present in the surface region of the secondary particle.

Particularly, according to the present invention, the above-described aspect ratio gradient of the primary particles may be realized by increasing a mixing ratio of the metal dopant relative to a precursor to increase the content of the metal dopant in the primary particle or specifying a calcination (heat treatment) condition for the mixture of the precursor of the metal dopant in a process of preparing the positive electrode active material.

Specifically, the average aspect ratio of the primary particles included in the positive electrode active material has a gradient increasing from the core of the secondary particle to the surface region of the secondary particle, and as the metal dopant in the primary particle increases, a difference between the average aspect ratio of all primary particles in the surface region of the secondary particle and the average aspect ratio of all primary particles in the core of the secondary particle is preferably reduced.

That is, it is preferable that the difference between the average aspect ratio of the primary particles in the core of the secondary particle and the average aspect ratio of the primary particles in the surface region of the secondary particle is not excessively large. Meanwhile, as the content of the metal dopant in the primary particle increases in the process of preparing the positive electrode active material, when the mixing ratio of the metal dopant relative to the precursor is excessively increased or the calcination (heat treatment) condition for the mixture of the precursor and the metal dopant is inappropriate (e.g., when a heating rate is excessively high, or an heat treatment time is excessively long), the difference between the average aspect ratio of the primary particles in the core of the secondary particle and the average aspect ratio of the primary particles in the surface region of the secondary particle may be excessively small. In this case, there is a concern that the reversible efficiency and lifetime characteristics of the positive electrode active material are degraded.

Here, the primary particles and the secondary particles included in the positive electrode active material may improve the particle density in the positive electrode active material by satisfying at least the above-described conditions. Accordingly, the electrochemical characteristics of the positive electrode active material may be improved.

In the positive electrode active material, a distance from the core to the surface region of the secondary particle is R, a region where the distance from the core of the secondary particle is 4/5R to R is defined as a first region ($R_1$), and a region where the distance from the core of the secondary particle is 0 to 2/5R is defined as a second region ($R_2$).

For example, when the average particle size of the secondary particles is 10 μm, the first region may be a region having a distance from the outermost surface of the secondary particle of 0 to 1 μm, and the second region may be a region having a distance from the core of the secondary particle of 0 to 2 μm.

Here, the average aspect ratio ($W_1$) of all primary particles in the first region is preferably less than 4.083, and more preferably 4.0 or less.

When the average aspect ratio ($W_1$) of all primary particles in the first region exceeds the numerical range defined above, the aspect ratio of the primary particles present in the surface region of the secondary particle compared to that of the core of the secondary particle is excessively high, and thus the shape of the primary particle present in the surface region of the secondary particle will be relatively close to a rod shape.

In addition, in order for the aspect ratio of the primary particles present in the surface region of the secondary particle to exceed the above-defined numerical range, the size of the aspect ratio gradient of the primary particles increasing from the core of the secondary particle to the surface region of the secondary particle needs to be excessively large.

In this case, it may be difficult to improve the density of the primary particles in the positive electrode active material and effectively reduce a partial strain caused by the asymmetric volume expansion of the positive electrode active material during the charging/discharging of a lithium secondary battery using the positive electrode active material. That is, due to the excessively increasing difference in aspect ratio of the primary particles present in the core of the secondary particle and the surface region of the secondary particle, it is difficult to suppress a strain due to volume expansion of the primary particle during charging/discharging, thereby increasing the possibility of the positive electrode active material cracking. This may act as a cause of deteriorating the electrochemical characteristics and/or stability of the positive electrode active material.

In addition, as the density of the primary particles in the positive electrode active material decreases, the specific surface area of the positive electrode active material may increase. When the specific surface area of the positive electrode active material increases, there is a concern that the lifetime and/or stability of a lithium secondary battery may be reduced because the possibility of a side reaction between the positive electrode active material and an electrolyte in the lithium secondary battery increases.

Meanwhile, the average aspect ratio ($W_2$) of all primary particles in the second region is preferably less than 1.842, and more preferably 1.8 or more.

When the average aspect ratio ($W_2$) of all primary particles in the second region exceeds the above-defined numerical range, the aspect ratio of the primary particles present in the core of the secondary particle is excessively high, which may act as the cause of reducing the density of the primary particles in the positive electrode active material.

In addition, the ratio ($W_1/W_2$) of the average aspect ratio ($W_1$) of all primary particles in the first region and the average aspect ratio ($W_2$) of all primary particles in the second region is preferably less than 2.217. As described above, the positive electrode active material according to the present invention may have improved electrical characteristics by reducing the degree of reducing the sphericity of the primary particle from the core of the secondary particle to the surface region of the secondary particle by adjusting an aspect ratio gradient of the primary particles included in the secondary particle.

That is, as the ratio ($W_1/W_2$) of the average aspect ratio ($W_1$) and the average aspect ratio ($W_2$) is allowed to be preferably less than 2.217, and more preferably 2.2 or less, the size of an aspect ratio gradient of the primary particles increasing from the core of the secondary particle to the surface region of the secondary particle may be reduced, and thus the size of a sphericity gradient of the primary particles decreasing from the core of the secondary particle to the surface region of the secondary particle may be reduced.

Likewise, when the ratio ($W_1/W_2$) of the average aspect ratio ($W_1$) and the average aspect ratio ($W_2$) is more than 2.217, the difference in aspect ratio between the primary particles present in the core of the secondary particle and the surface region of the secondary particle may be excessively large, and during charging/discharging, the possibility of cracking caused by the volume expansion of the primary particles may increase.

In addition, the ratio ($W_1/W_2$) of the average aspect ratio ($W_1$) and the average aspect ratio ($W_2$) may be at least 1.280, which may mean that at least the average aspect ratio of the primary particles exhibits a gradient increasing from the core of the secondary particle to the surface region of the secondary particle. As such, since the primary particles in the secondary particle exhibit an aspect ratio gradient increasing from the core of the secondary particle to the surface region of the secondary particle, and the size of the aspect ratio gradient represented by the ratio ($W_1/W_2$) of the average aspect ratio ($W_1$) of all primary particles in the first region and the average aspect ratio ($W_2$) of all primary particles in the second region is in the range of more than 1.280 and less than 2.217, the electrical characteristics of the positive electrode active material present in various trade-off relationships may be optimized.

Meanwhile, among primary particles in the first region, the proportion of the primary particles having a smaller aspect ratio than the average aspect ratio ($W_1$) may be 45% or more. That is, the above-defined proportion of the primary particles is for preventing the average aspect ratio ($W_1$) of all primary particles in the first region from having a value of 4.083 or more by adjusting the proportion of the primary particles having a higher aspect ratio than the average aspect ratio ($W_1$) among the primary particles in the first region.

In addition, a ratio ($W_3/W_2$) of the average aspect ratio ($W_3$) of primary particles having a smaller aspect ratio than the average aspect ratio ($W_1$) among the primary particles in the first region and the average aspect ratio ($W_2$) may be more than 0.984 and less than 1.465. That is, in the positive electrode active material having an aspect ratio gradient or sphericity gradient as intended by the present invention, the increment in the aspect ratio of the primary particles present in the first region is less than that of the aspect ratio of the primary particles present in the second region, which indicates that the primary particles present in the first region may have a shape relatively close to a spherical shape.

Meanwhile, a ratio ($W_4/W_2$) of the average aspect ratio ($W_4$) of the primary particles having a higher aspect ratio than the average aspect ratio ($W_1$) among the primary particles in the first region and the average aspect ratio ($W_2$) may be more than 1.793 and less than 3.076. This means that, in the positive electrode active material having an aspect ratio gradient or sphericity gradient as intended by the present invention, even primary particles with a larger increment in aspect ratio of the primary particles present in the second region among the primary particles present in the first region do not have a perfect rod shape with an extremely large aspect ratio.

The primary particles satisfying the above-described various conditions may be defined as a lithium composite oxide represented by Formula 1 below.

$$Li_wNi_{1-(x+y+z+z')}Co_xM1_yM2_zNb_{z'}O_2 \quad \text{[Formula 1]}$$

(Here, M1 is at least one selected from Mn and Al,

M2 is at least one selected from P, Sr, Ba, B, Ti, Zr, Mn, Al, W, Ce, Hf, Ta, Cr, F, Mg, Cr, V, Fe, Zn, Si, Y, Ga, Sn, Mo, Ge, Nd, Gd and Cu, M1 and M2 are different elements, and $0.5 \leq w \leq 1.5$, $0 \leq x \leq 0.50$, $0 \leq y \leq 0.20$, $0 \leq z \leq 0.20$, and $0 \leq z' \leq 0.20$.)

Here, a difference between the average aspect ratio of all primary particles in the surface region of the secondary particle and the average aspect ratio of all primary particles in the core of the secondary particle, and particularly, the ratio ($W_1/W_2$) of the average aspect ratio ($W_1$) and the average aspect ratio ($W_2$) may decrease, as the z' value increases. In addition, the ratio ($W_1/W_2$) of the average aspect ratio ($W_1$) and the average aspect ratio ($W_2$) may be reduced by specifying a calcination (heat treatment) condition for a mixture of a precursor of the lithium composite oxide represented by Formula 1 and a metal dopant (Nb-containing raw material).

In addition, M2 and/or niobium (Nb) present in the surface region of the secondary particle may exhibit a concentration gradient decreasing toward the core of the secondary particle. That is, the direction of the concentration gradient of M2 and/or niobium (Nb) may be a direction from the surface region of the secondary particle to the core of the secondary particle.

Particularly, a lithium ion diffusion path in the primary particle may be formed in the same direction as the direction of the concentration gradient of M2 and/or niobium (Nb), that is, a direction from the surface region of the secondary particle to the core of the secondary particle. The lithium ion diffusion path is formed in the same direction as that of the concentration gradient of M2 and/or niobium (Nb) (or a direction from the core of the secondary particle to the surface region of the secondary particle), or to form an angle within ±400 with respect to a virtual straight light connecting the core of the secondary particle with the surface region of the secondary particle.

Like this, as the lithium ion diffusion path in the primary particle is formed in a direction from the core of the secondary particle to the surface region of the secondary particle, the diffusion property of lithium ions in the positive electrode active material may be improved, and it may contribute to the improvement in electrical characteristics of the positive electrode active material.

In addition, according to another embodiment, the positive electrode active material according to the present invention may include a coating layer covering at least a part of the surface(s) of the primary particle (e.g., the interface between the primary particles) and/or the secondary particle formed by aggregating the primary particles.

For example, the coating layer may be present to cover at least a part of an exposed surface of the primary particle. Particularly, the coating layer may be present to cover at least a part of the exposed surface of the primary particle present on the outermost surface of the secondary particle.

Accordingly, the coating layer may be present as a layer continuously or discontinuously coating the surface(s) of the primary particle and/or the secondary particle formed by aggregating the primary particles. When the coating layer is present discontinuously, it may have an island shape.

The coating layer present as above may contribute to the improvement of physical and electrochemical characteristics of the positive electrode active material.

In addition, the coating layer may be present as a solid solution which does not form a boundary between the primary particle and/or the secondary particles formed by aggregating the primary particles.

The coating layer may include at least one oxide represented by Formula 2 below. That is, the coating layer may be defined as a region in which an oxide represented by Formula 2 below is present.

$$Li_aM3_bO_c \quad \text{[Formula 2]}$$

(Here, M3 is at least one selected from Ni, Mn, Co, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Ce, Gd and Nd, and $0 \leq a \leq 10$, $0 \leq b \leq 8$, and $2 \leq c \leq 13$.)

In addition, the coating layer may have a form in which heterogeneous oxides are simultaneously present in one layer, or heterogeneous oxides represented by Formula 2 as described above are present in separate layers, respectively.

The oxide represented by Formula 2 may be physically and/or chemically bonded with the primary particle represented by Formula 1. In addition, the oxide may form a solid solution with the primary particle represented by Formula 1.

The positive electrode active material according to the embodiment may include a coating layer covering at least a part of the surface(s) of the primary particle (e.g., the interface between the primary particles) and/or the secondary particle formed by aggregating the primary particles, thereby increasing structural stability. In addition, when the positive electrode active material is used in a lithium secondary battery, the high temperature storage stability and lifetime characteristics of the positive electrode active material may be improved. In addition, the oxide may reduce residual lithium in the positive electrode active material and act as a lithium ion migration pathway, and thus may affect the improvement in efficiency characteristics of the lithium secondary battery.

In addition, in some cases, the oxide may be present not only in at least a part of the interface between the primary particles and the surface of the secondary particle, but also in an inner void formed in the secondary particle.

The oxide may be an oxide in which lithium and an element represented by A are combined or an oxide of A, and the oxide may be, for example, $Li_aW_bO_c$, $Li_aZr_bO_c$, $Li_aTi_bO_c$, $Li_aNi_bO_c$, $Li_aB_bO_c$, $Li_aCO_bO_c$, $Li_aAl_bO_c$, $Co_bO_c$, $Al_bO_c$, $W_bO_c$, $Zr_bO_c$, $Ti_bO_c$ or $B_bO_c$, but the above examples are merely described for convenience to help in understanding, and the oxide defined in the present invention is not limited to the above-described examples.

In another embodiment, the oxide may be or further include an oxide in which lithium and at least two types of elements represented by A are combined. The oxide in which lithium and at least two types of elements represented by A are combined may be, for example, $Li_a(W/Ti)_bO_c$, $Li_a(W/$ $Zr)_bO_c$, $Li_a(W/Ti/Zr)_bO_c$, or $Li_a(W/Ti/B)_bO_c$, but the present invention is not necessarily limited thereto.

Here, the oxide may exhibit a concentration gradient decreasing from the surface region of the secondary particle to the core of the secondary particle. Accordingly, the concentration of the oxide may decrease from the outermost surface of the secondary particle to the core of the secondary particle.

As described above, as the oxide exhibits a concentration gradient decreasing from the surface region of the secondary particle to the core of the secondary particle, residual lithium present on the surface of the positive electrode active material may be effectively reduced, thereby preventing a side reaction caused by unreacted residual lithium in advance. In addition, a decrease in crystallinity in the inner surface region of the positive electrode active material caused by the oxide may be prevented. In addition, the breakdown of the entire structure of the positive electrode active material due to the oxide in an electrochemical reaction may be prevented.

In addition, the coating layer may include a first oxide layer including at least one oxide represented by Formula 2, and a second oxide layer which includes at least one oxide represented by Formula 2 and a different oxide from the oxide included in the first oxide layer.

For example, the first oxide layer may be present to cover at least a part of the exposed surface of the primary particle present on the outermost surface of the secondary particle, and the second oxide layer may be present to cover at least a part of the exposed surface of the primary particle not covered by the first oxide layer and the surface of the first oxide layer.

Lithium Secondary Battery

Another aspect of the present invention may provide a positive electrode including a positive electrode current collector and a positive electrode active material layer formed on the positive electrode current collector. Here, the positive electrode active material layer may include, as a positive electrode active material, any one of the lithium composite oxides according to various embodiments of the present invention described above. Therefore, since the positive electrode active material is the same as described above, detailed description thereof will be omitted for convenience, and hereinafter, other components that have not been described will be described.

The positive electrode current collector is not particularly limited as long as it does not cause a chemical change in a battery and has conductivity, and for example, stainless steel, aluminum, nickel, titanium, calcined carbon, or aluminum or stainless steel whose surface is treated with carbon, nickel, titanium or silver may be used. In addition, the positive electrode current collector may conventionally have a thickness of 3 to 500 m, and fine irregularities may be formed on the surface of the current collector, thereby increasing the adhesive strength of a positive electrode active material. For example, the positive electrode current collector may be used in various forms such as a film, a sheet, a foil, a net, a porous body, foam, a non-woven fabric, etc.

The positive electrode active material layer may be prepared by coating the positive electrode current collector with a positive electrode slurry composition including the positive electrode active material, a conductive material, and a binder included selectively as needed.

Here, the positive electrode active material is included at 80 to 99 wt %, and specifically, 85 to 98.5 wt % with respect to the total weight of the positive electrode active material layer. When the positive electrode active material is included in the above content range, excellent capacity characteristics may be exhibited, but the present invention is not limited thereto.

The conductive material is used to impart conductivity to an electrode, and is not particularly limited as long as it has electron conductivity without causing a chemical change in a battery. A specific example of the conductive material may be graphite such as natural graphite or artificial graphite; a carbon-based material such as carbon black, acetylene black, Ketjen black, channel black, furnace black, lamp black, thermal black or a carbon fiber; a metal powder or metal fiber consisting of copper, nickel, aluminum, or silver; a conductive whisker consisting of zinc oxide or potassium titanate; a conductive metal oxide such as titanium oxide; or a conductive polymer such as a polyphenylene derivative, and one or a mixture of two or more thereof may be used. The conductive material may be generally contained at 0.1 to 15 wt % with respect to the total weight of the positive electrode active material layer.

The binder serves to improve attachment between particles of the positive electrode active material and the adhesive strength between the positive electrode active material and a current collector. A specific example of the binder may be polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber (SBR), fluorine rubber, or various copolymers thereof, and one or a mixture of two or more thereof may be used. The binder may be included at 0.1 to 15 wt % with respect to the total weight of the positive electrode active material layer.

The positive electrode may be manufactured according to a conventional method of manufacturing a positive electrode, except that the above-described positive electrode active material is used. Specifically, the positive electrode may be manufactured by applying a positive electrode slurry composition prepared by dissolving or dispersing the positive electrode active material, and selectively, a binder and a conductive material in a solvent on the positive electrode current collector, and drying and rolling the resulting product.

The solvent may be a solvent generally used in the art, and may be dimethyl sulfoxide (DMSO), isopropyl alcohol, N-methylpyrrolidone (NMP), acetone or water, and one or a mixture of two or more thereof may be used. In consideration of the coating thickness and production yield of a slurry, the solvent is used at a sufficient amount for dissolving or dispersing the positive electrode active material, the conductive material and the binder and then imparting a viscosity for exhibiting excellent thickness uniformity when the slurry is applied to prepare a positive electrode.

In addition, in another exemplary embodiment, the positive electrode may be prepared by casting the positive electrode slurry composition on a separate support, and laminating a film obtained by delamination from the support on the positive electrode current collector.

Still another aspect of the present invention provides an electrochemical device including the above-described positive electrode. The electrochemical device may be, specifically, a battery, a capacitor, and more specifically, a lithium secondary battery.

The lithium secondary battery may specifically include a positive electrode, a negative electrode disposed opposite to the positive electrode, and a separator and an electrolyte, which are interposed between the positive electrode and the negative electrode. Here, since the positive electrode is the same as described above, for convenience, detailed description for the positive electrode will be omitted, and other components which have not been described below will be described in detail.

The lithium secondary battery may further include a battery case accommodating an electrode assembly of the positive electrode, the negative electrode and the separator, and selectively, a sealing member for sealing the battery case.

The negative electrode may include a negative electrode current collector and a negative electrode active material layer disposed on the negative electrode current collector.

The negative electrode current collector is not particularly limited as long as it has high conductivity without causing a chemical change in a battery, and may be, for example, copper, stainless steel, aluminum, nickel, titanium, calcined carbon, or copper or stainless steel whose surface is treated with carbon, nickel, titanium or silver, or an aluminum-cadmium alloy. In addition, the negative electrode current collector may generally have a thickness of 3 to 500 μm, and like the positive electrode current collector, fine irregularities may be formed on the current collector surface, thereby enhancing the binding strength of the negative electrode active material. For example, the negative electrode current collector may be used in various forms such as a film, a sheet, a foil, a net, a porous body, foam, a non-woven fabric, etc.

The negative electrode active material layer may be formed by coating the negative electrode current collector with a negative electrode slurry composition including the negative electrode active material, a conductive material and a binder selectively included as needed.

As the negative electrode active material, a compound enabling the reversible intercalation and deintercalation of lithium may be used. A specific example of the negative electrode active material may be a carbonaceous material such as artificial graphite, natural graphite, graphitized carbon fiber or amorphous carbon; a metallic compound capable of alloying with lithium, such as Si, Al, Sn, Pb, Zn, Bi, In, Mg, Ga, Cd, a Si alloy, a Sn alloy or an Al alloy; a metal oxide capable of doping and dedoping lithium such as $SiO_\beta$ (0<β<2), $SnO_2$, vanadium oxide, or lithium vanadium oxide; or a composite including the metallic compound and the carbonaceous material such as a Si—C composite or a Sn—C composite, and any one or a mixture of two or more thereof may be used. In addition, as the negative electrode active material, a metal lithium thin film may be used. In addition, as a carbon material, both low-crystalline carbon and high-crystalline carbon may be used. Representative examples of the low-crystalline carbon include soft carbon and hard carbon, and representative examples of the high-crystalline carbon include amorphous, sheet-type, flake-type, spherical or fiber-type natural or artificial graphite, Kish graphite, pyrolytic carbon, mesophase pitch-based carbon fiber, meso-carbon microbeads, mesophase pitches, and high-temperature calcined carbon such as petroleum or coal tar pitch derived cokes.

The negative electrode active material may be included at 80 to 99 wt % with respect to the total weight of the negative electrode active material layer.

The binder is a component aiding bonding between a conductive material, an active material and a current collector, and may be generally added at 0.1 to 10 wt % with respect to the total weight of the negative electrode active material layer. Examples of the binder may include polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber, nitrile-butadiene rubber, fluorine rubber, and various copolymers thereof.

The conductive material is a component for further improving conductivity of the negative electrode active material, and may be added at 10 wt % or less, and preferably, 5 wt % or less with respect to the total weight of the negative electrode active material layer. The conductive material is not particularly limited as long as it does not cause a chemical change in the battery, and has conductivity, and may be, for example, graphite such as natural graphite or artificial graphite; carbon black such as acetylene black, Ketjen black, channel black, furnace black, lamp black or thermal black; a conductive fiber such as a carbon fiber or a metal fiber; a metal powder such as fluorinated carbon, aluminum, or nickel powder; a conductive whisker such as zinc oxide or potassium titanate; a conductive metal oxide such as titanium oxide; or a conductive material such as a polyphenylene derivative.

In an exemplary embodiment, the negative electrode active material layer maybe prepared by applying a composition for forming the negative electrode active material layer, which is prepared by dissolving or dispersing a negative electrode active material, and selectively a binder and a conductive material in a solvent, on the negative electrode current collector, and drying the resulting product, or may be prepared by casting a composition for forming the negative electrode active material layer on a separate support and laminating a film obtained by delamination from the support on the negative electrode current collector.

In addition, in another exemplary embodiment, the negative electrode active material layer may be prepared by applying a composition for forming the negative electrode active material layer, which is prepared by dissolving or dispersing a negative electrode active material, and selectively a binder and a conductive material in a solvent, on the negative electrode current collector, and drying the resulting product, or may be prepared by casting a composition for forming the negative electrode active material layer on a separate support, and then laminating a film obtained by delamination from the support on the negative electrode current collector.

Meanwhile, in the lithium secondary battery, a separator is not particularly limited as long as it is generally used in a lithium secondary battery to separate a negative electrode from a positive electrode and provide a diffusion path for lithium ions, and particularly, the separator has a low resistance to ion mobility of an electrolyte and an excellent electrolyte solution impregnation ability. Specifically, a porous polymer film, for example, a porous polymer film prepared of a polyolefin-based polymer such as an ethylene homopolymer, a propylene homopolymer, an ethylene/butene copolymer, an ethylene/hexene copolymer and an ethylene/methacrylate copolymer, or a stacked structure including two or more layers thereof may be used. In addition, a conventional porous non-woven fabric, for example, a non-woven fabric formed of a high melting point glass fiber or a polyethylene terephthalate fiber may be used. In addition, a coated separator including a ceramic component or a polymer material may be used to ensure thermal resistance or mechanical strength, and may be selectively used in a single- or multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, or a molten-type inorganic electrolyte, which can be used in production of a lithium secondary battery, but the present invention is not limited thereto.

Specifically, the electrolyte may include an organic solvent and a lithium salt.

The organic solvent is not particularly limited as long as it can serve as a medium enabling the transfer of ions involved in an electrochemical reaction of a battery. Specifically, the organic solvent may be an ester-based solvent such as methyl acetate, ethyl acetate, 7-butyrolactone, or F-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; a nitrile-based solvent such as R—CN (R is a linear, branched or cyclic C2 to C20 hydrocarbon group, and may include a double bonded aromatic ring or an ether bond); an amide-based solvent such as dimethylformamide; a dioxolane-based solvent such as 1,3-dioxolane; or a sulfolane-based solvent. Among these, a carbonate-based solvent is preferably used, and a mixture of a cyclic carbonate (for example, ethylene carbonate or propylene carbonate) having high ion conductivity and high permittivity to increase the charge/discharge performance of a battery and a low-viscosity linear carbonate-based compound (for example, ethyl methyl carbonate, dimethyl carbonate or diethyl carbonate) is more preferably used. In this case, by using a mixture of a cyclic carbonate and a chain-type carbonate in a volume ratio of about 1:1 to about 1:9, the electrolyte solution may exhibit excellent performance.

The lithium salt is not particularly limited as long as it is a compound capable of providing a lithium ion used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$. The concentration of the lithium salt is preferably in the range of 0.1 to 2.0M. When the concentration of the lithium salt is included in the above-mentioned range, the electrolyte has suitable conductivity and viscosity and thus can exhibit excellent electrolytic performance. Therefore, lithium ions can effectively migrate.

To enhance lifespan characteristics of the battery, inhibit a decrease in battery capacity, and enhance discharge capacity of the battery, the electrolyte may further include one or more types of additives, for example, a haloalkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride, in addition to the components of the electrolyte. Here, the additive(s) may be included at 0.1 to 5 wt % with respect to the total weight of the electrolyte.

Since the lithium secondary battery including the positive electrode active material according to the present invention stably exhibits excellent discharge capacity, excellent output characteristics and excellent lifespan characteristics, it is useful in portable devices such as a mobile phone, a notebook computer and a digital camera and an electric automobile field such as a hybrid electric vehicle (HEV).

The outer shape of the lithium secondary battery according to the present invention is not particularly limited, but may be a cylindrical, prismatic, pouch or coin type using a can. In addition, the lithium secondary battery may be used in a battery cell that is not only used as a power source of a small device, but also preferably used as a unit battery for a medium-to-large battery module including a plurality of battery cells.

According to yet another exemplary embodiment of the present invention, a battery module including the lithium secondary battery as a unit cell and/or a battery pack including the same is provided.

The battery module or the battery pack may be used as a power source of any one or more medium-to-large devices including a power tool; an electric motor vehicle such as an electric vehicle (EV), a hybrid electric vehicle, and a plug-in hybrid electric vehicle (PHEV); and a power storage system.

Hereinafter, the present invention will be described in further detail with reference to examples. However, these examples are merely provided to explain the present invention, and it will not be interpreted that the scope of the present invention is limited by the examples below.

Preparation Example 1. Preparation of Positive Electrode Active Material (1) Example 1

A spherical $Ni_{0.80}Co_{0.10}Mn_{0.10}(OH)_2$ hydroxide precursor was synthesized by a co-precipitation method. Specifically, in a 90 L reactor, 25 wt % NaOH and 30 wt % $NH_4OH$ were input into an aqueous 1.5M sulfuric acid solution of a transition metal composite in which nickel sulfate, cobalt sulfate and manganese sulfate are mixed in a molar ratio of 80:1:1. The pH in the reactor was maintained at 11.5, the temperature of the reactor was maintained at 60° C., and an inert gas $N_2$ was added to the reactor to prevent the prepared precursor from being oxidized. After the completion of synthesis and stirring, washing and dehydration were performed using filter press (F/P) equipment, thereby obtaining a $Ni_{0.8}Co_{0.1}Mn_{0.1}(OH)_2$ hydroxide precursor.

Subsequently, a lithium composite oxide was prepared by adding LiOH and an Nb-containing raw material ($Nb_2O_5$) to the synthesized precursor and calcinating the same. Specifically, a lithium composite oxide was obtained by mixing LiOH and an Nb-containing raw material ($Nb_2O_5$) with a precursor, subjected to heat treatment for 15 hours in a calcination furnace by raising a temperature 1° C. per minute until 830° C. in an O2 atmosphere, and naturally cooled. The Nb-containing raw material ($Nb_2O_5$) was mixed to be 0.5 mol % in the total composition before calcination.

Subsequently, the obtained lithium composite oxide was subjected to heat treatment in a calcination furnace for 20 hours by raising the temperature 2° C. per minute until 700° C. in an O2 atmosphere and then naturally cooled.

(2) Example 2

A positive electrode active material was prepared by the same method as described in Example 1, except that the Nb-containing raw material ($Nb_2O_5$) was added to be 1.0 mol % in the total composition before calcination, and heat treatment was performed in a calcination furnace by raising a temperature 1° C. per minute until 860° C. in an O2 atmosphere.

(3) Example 3

A positive electrode active material was prepared by the same method as described in Example 1, except that a spherical $Ni_{0.94}Co_{0.03}Mn_{0.03}(OH)_2$ hydroxide precursor was synthesized by a co-precipitation method, and then LiOH and an Nb-containing raw material ($Nb_2O_5$) were added thereto and calcined, thereby preparing a lithium composite oxide, and the Nb-containing raw material ($Nb_2O_5$) was added to be 1.0 mol % in the total composition before calcination, and heat treatment was performed in a calcination furnace by raising a temperature 1° C. per minute until 780° C. in an O2 atmosphere.

(4) Comparative Example 1

A positive electrode active material was prepared by the same method as described in Example 1, except that the Nb-containing raw material ($Nb_2O_5$) was not mixed before calcination, and heat treatment was performed in a calcination furnace by raising a temperature 1° C. per minute until 810° C. in an $O_2$ atmosphere.

(5) Comparative Example 2

A positive electrode active material was prepared by the same method as described in Example 1, except that the Nb-containing raw material ($Nb_2O_5$) was mixed to be 2.0 mol % in the total composition before calcination, and heat treatment was performed in a calcination furnace by raising a temperature 1° C. per minute until 860° C. in an $O_2$ atmosphere.

(6) Comparative Example 3

A positive electrode active material was prepared by the same method as described in Example 3, except that the Nb-containing raw material ($Nb_2O_5$) was mixed to be 0.5 mol % in the total composition before calcination, and heat treatment was performed in a calcination furnace by raising a temperature 1° C. per minute until 760° C. in an $O_2$ atmosphere.

(7) Comparative Example 4

A positive electrode active material was prepared by the same method as described in Example 3, except that the Nb-containing raw material ($Nb_2O_5$) was mixed to be 2.0 mol % in the total composition before calcination, and heat treatment was performed in a calcination furnace by raising a temperature 1° C. per minute until 820° C. in an O2 atmosphere.

(8) Comparative Example 5

A positive electrode active material was prepared by the same method as described in Example 1, except that LiOH and an Nb-containing raw material ($Nb_2O_5$) were added to a synthesized precursor to be 0.5 mol % in the total composition, and the mixture was subjected to heat treatment for 15 hours in a calcination furnace by raising a temperature 5° C. per minute until 830° C. in an O2 atmosphere and then naturally cooled.

(9) Comparative Example 6

A positive electrode active material was prepared by the same method as described in Example 1, except that LiOH and an Nb-containing raw material ($Nb_2O_5$) were added to a synthesized precursor to be 0.5 mol % in the total composition, and the mixture was subjected to heat treatment for 20 hours in a calcination furnace by raising a temperature 1° C. per minute until 830° C. in an O2 atmosphere and then naturally cooled.

Preparation Example 2. Preparation of Lithium Secondary Battery

A positive electrode slurry was prepared by dispersing 94 wt % of the positive electrode active material prepared according to Preparation Example 1, 3 wt % of carbon black and 3 wt % of a PVDF binder in 30 g of N-methyl-2 pyrrolidone (NMP). A positive electrode was formed by applying and drying the positive electrode slurry on an aluminum (Al) thin film, which is a positive electrode current collector, with a thickness of 15 m, and performing roll pressing. The positive electrode had a loading level of 10 mg/cm$^2$, and an electrode density of 3.2 g/cm$^3$.

A metal lithium was used as a counter electrode for the positive electrode, and an electrolyte solution was prepared by adding 1.15M $LiPF_6$ to a solvent prepared by mixing ethylene carbonate (EC), ethyl methyl carbonate (EMC) and dimethyl carbonate (DMC) in a volume ratio of 2:4:4.

A lithium secondary battery (coin cell) was prepared by forming a battery assembly by interposing a separator formed of a porous polyethylene (PE) film between the positive electrode and the negative electrode, and injecting the electrolyte solution thereinto.

Experimental Example 1. TEM Analysis of Positive Electrode Active Material

Each of the positive electrode active materials (secondary particle) according to Example 1, Comparative Example 1 and Comparative Example 2 was subjected to cross-sectioning with a cross-section polisher (accelerating voltage: 5.0 kV, 4-hour milling), and then cross-sectional TEM images were obtained. Here, a region in which the average particle size of the positive electrode active material was 10 μm, and on the cross-sectional TEM image, where a distance from the outermost surface of the positive electrode active material is 0 to 1 μm was defined as a surface region (first region), and a region where a distance from the core of the positive electrode active material is 0 to 2 μm was defined as a core (second region).

FIG. 1 is a cross-sectional TEM image of the positive electrode active material according to Example 1 of the present invention, and FIGS. 2 to 5 are partially enlarged images of the region shown in FIG. 1.

Figure 6:
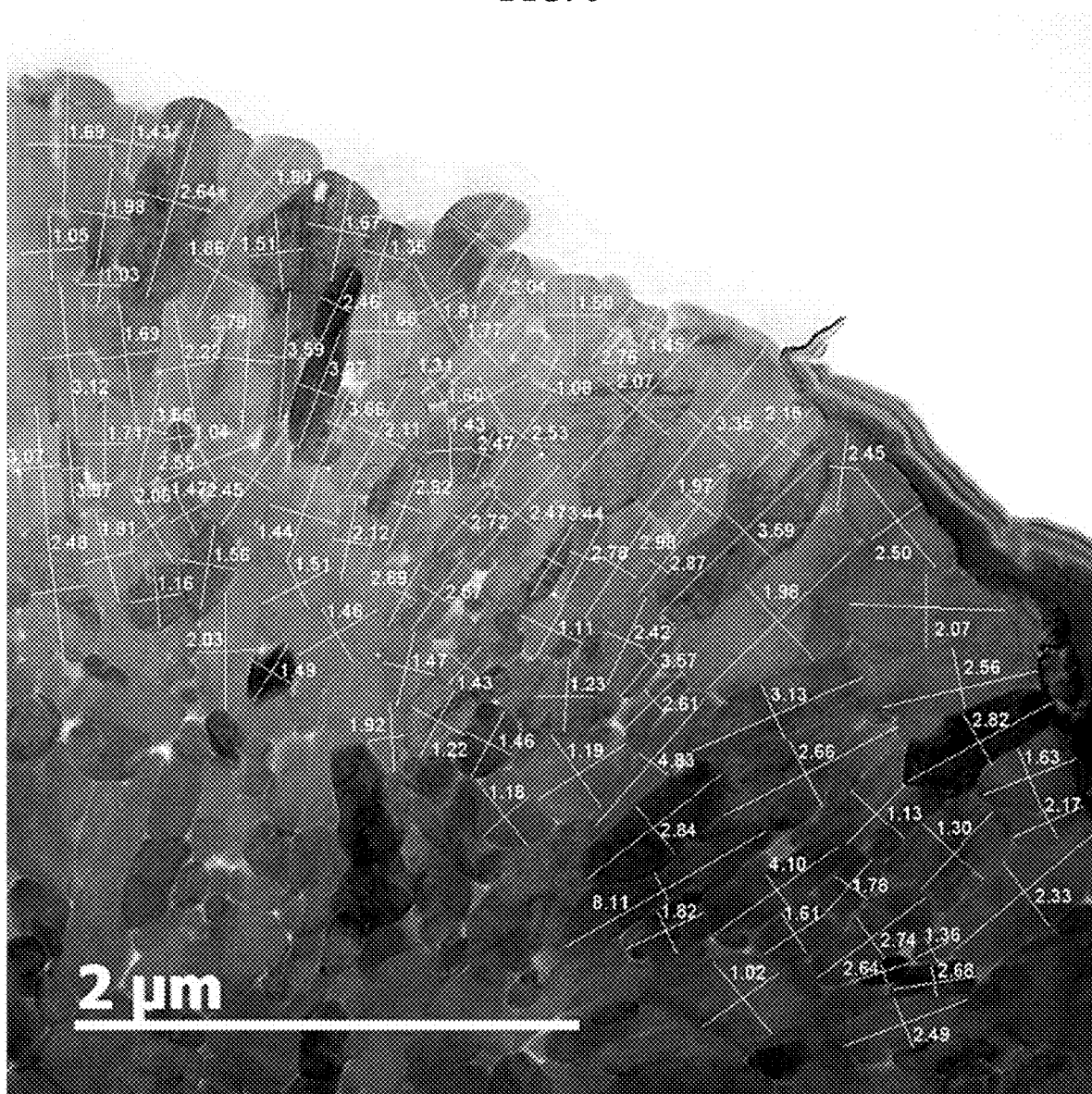
FIG. 6 is a cross-sectional TEM image showing a result of measuring the aspect ratio of primary particles in the surface region (first region) of the positive electrode active material according to Example 1 of the present invention.
Figure 7:
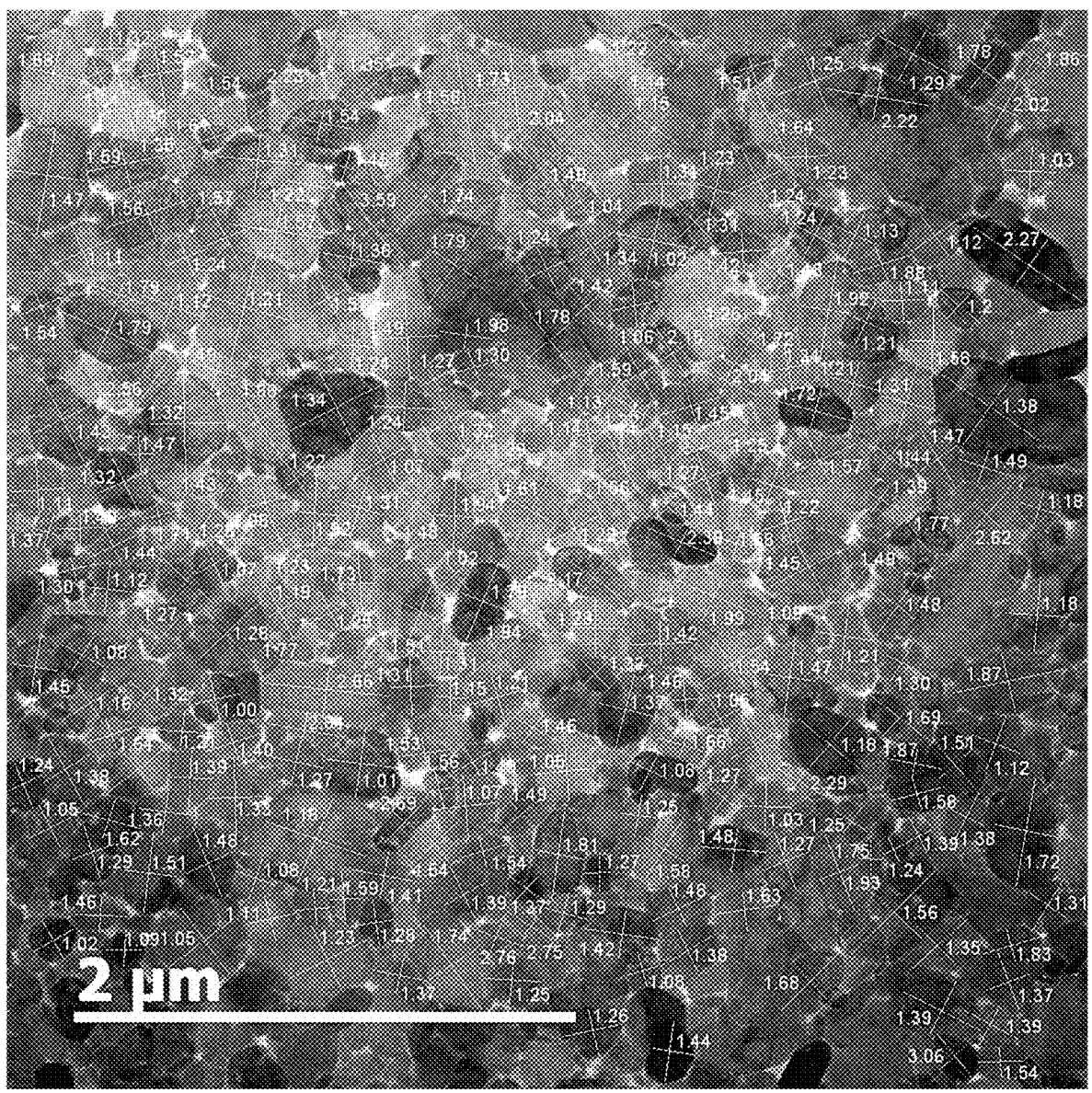
FIG. 7 is a cross-sectional TEM image showing a result of measuring the aspect ratio of primary particles in the core (second region) of the positive electrode active material according to Example 1 of the present invention.

FIG. 6 is a cross-sectional TEM image showing a result of measuring the aspect ratio of primary particles in the surface region (first region) of the positive electrode active material according to Example 1 of the present invention, and FIG. 7 is a cross-sectional TEM image showing a result of measuring the aspect ratio of primary particles in the core (second region) of the positive electrode active material according to Example 1 of the present invention.

Referring to FIGS. 1 to 7, it can be confirmed that the positive electrode active material according to Example 1 has an aspect ratio gradient increasing from the core of the secondary particle to the surface region of the secondary particle, and the shape of the primary particle present in the first region (first section, second section and fourth section) is relatively close to a spherical form. Particularly, referring to the result of measuring an aspect ratio shown in FIGS. 6 and 7, the increment in aspect ratio of the primary particles present in the first region compared with the primary particle present in the second region is not excessively large, indicating that the aspect ratio or sphericity of the primary particle present in the first region is larger than that of Comparative Example 1.

Figure 8:
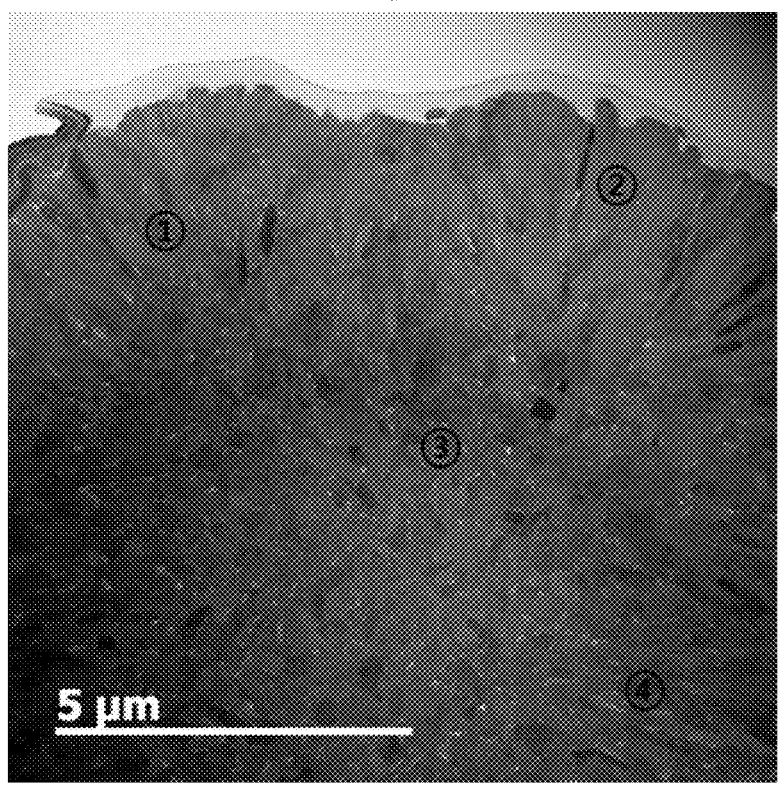
FIG. 8 is a cross-sectional TEM image of a positive electrode active material according to Comparative Example 1.
Figure 9:
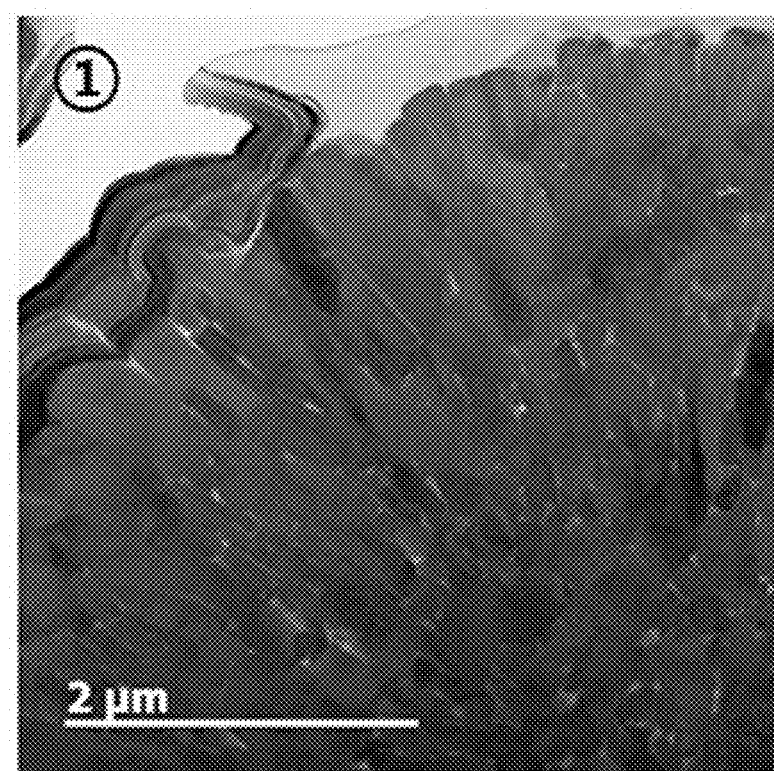
FIGS. 9 to 12 are partially enlarged images of the region shown in FIG. 8.
Figure 10:
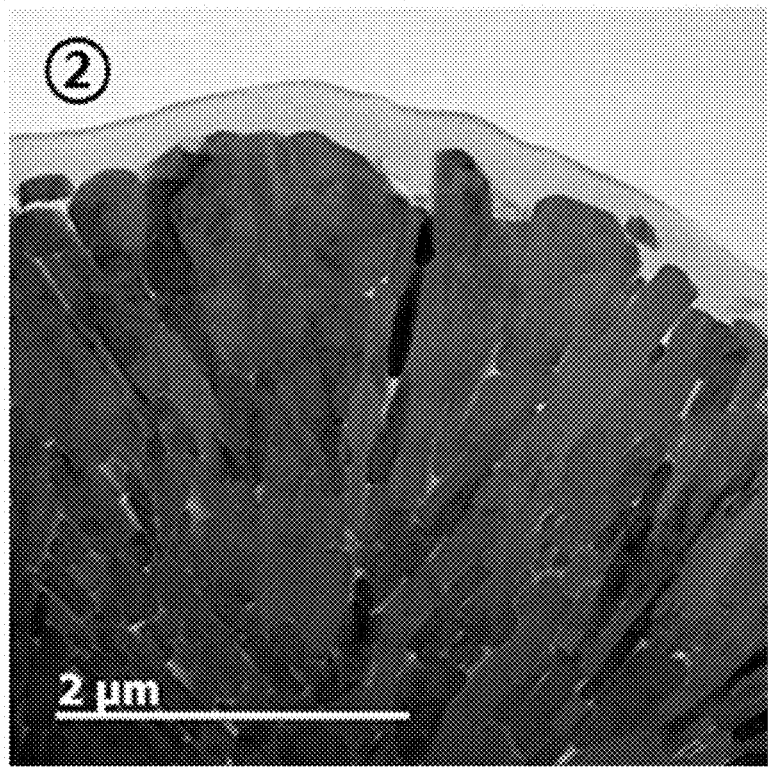
Figure 11:
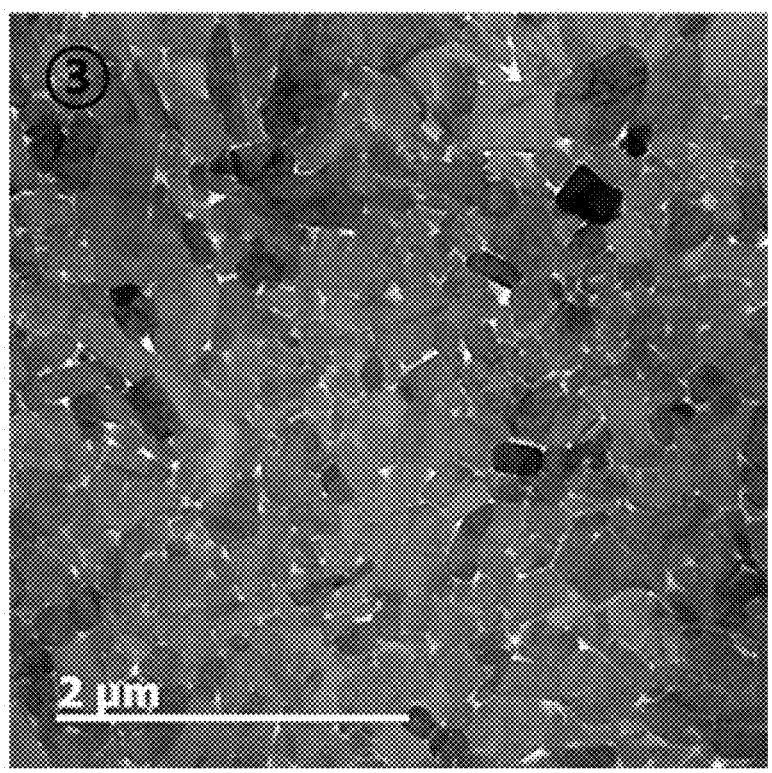
Figure 12:
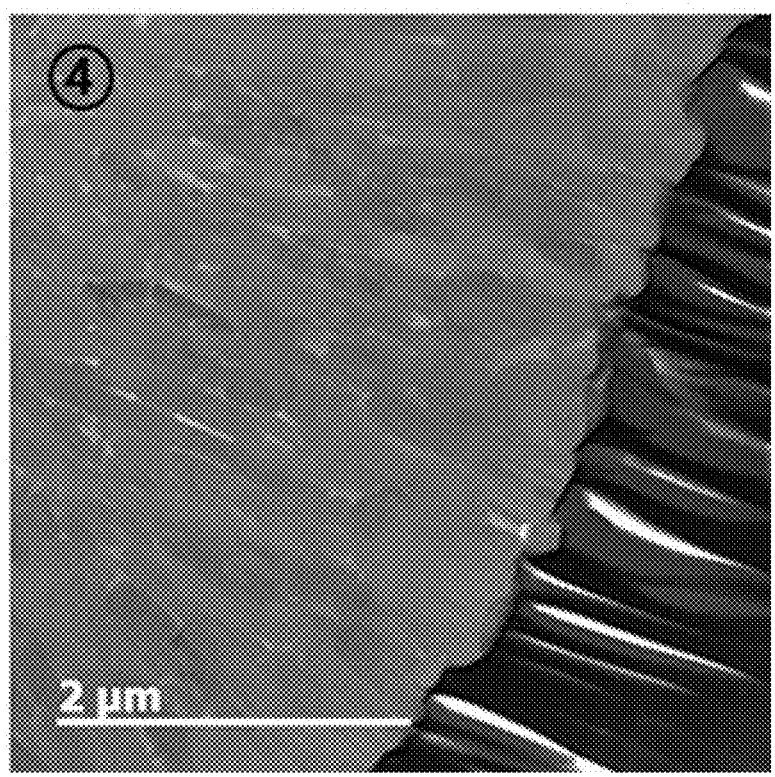

FIG. 8 is a cross-sectional TEM image of a positive electrode active material according to Comparative Example 1, and FIGS. 9 to 12 are partially enlarged images of the region shown in FIG. 8.

Figure 13:
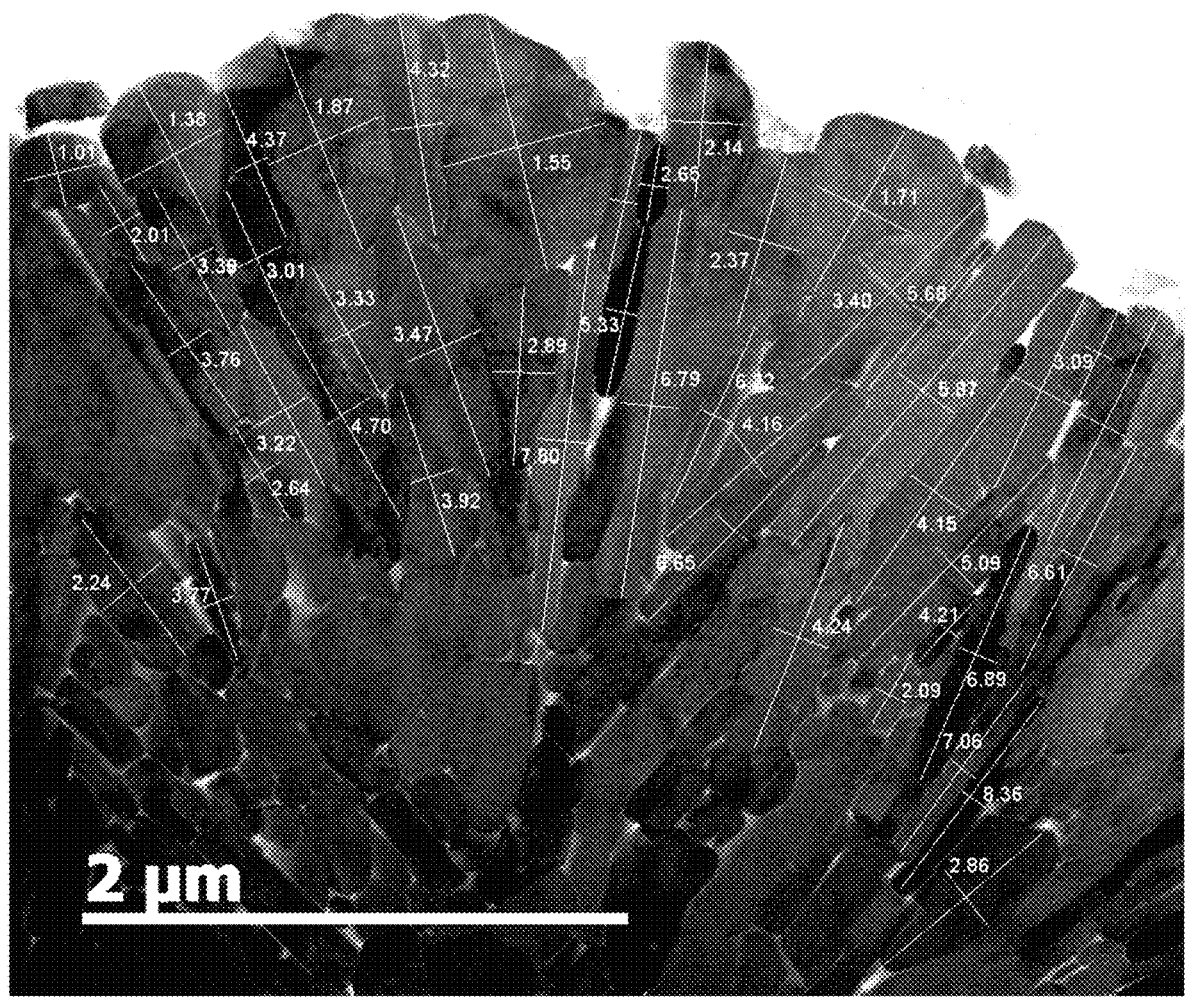
FIG. 13 is a cross-sectional TEM image showing the result of measuring the aspect ratio of primary particles in the surface region (first region) of the positive electrode active material according to Comparative Example 1.
Figure 14:
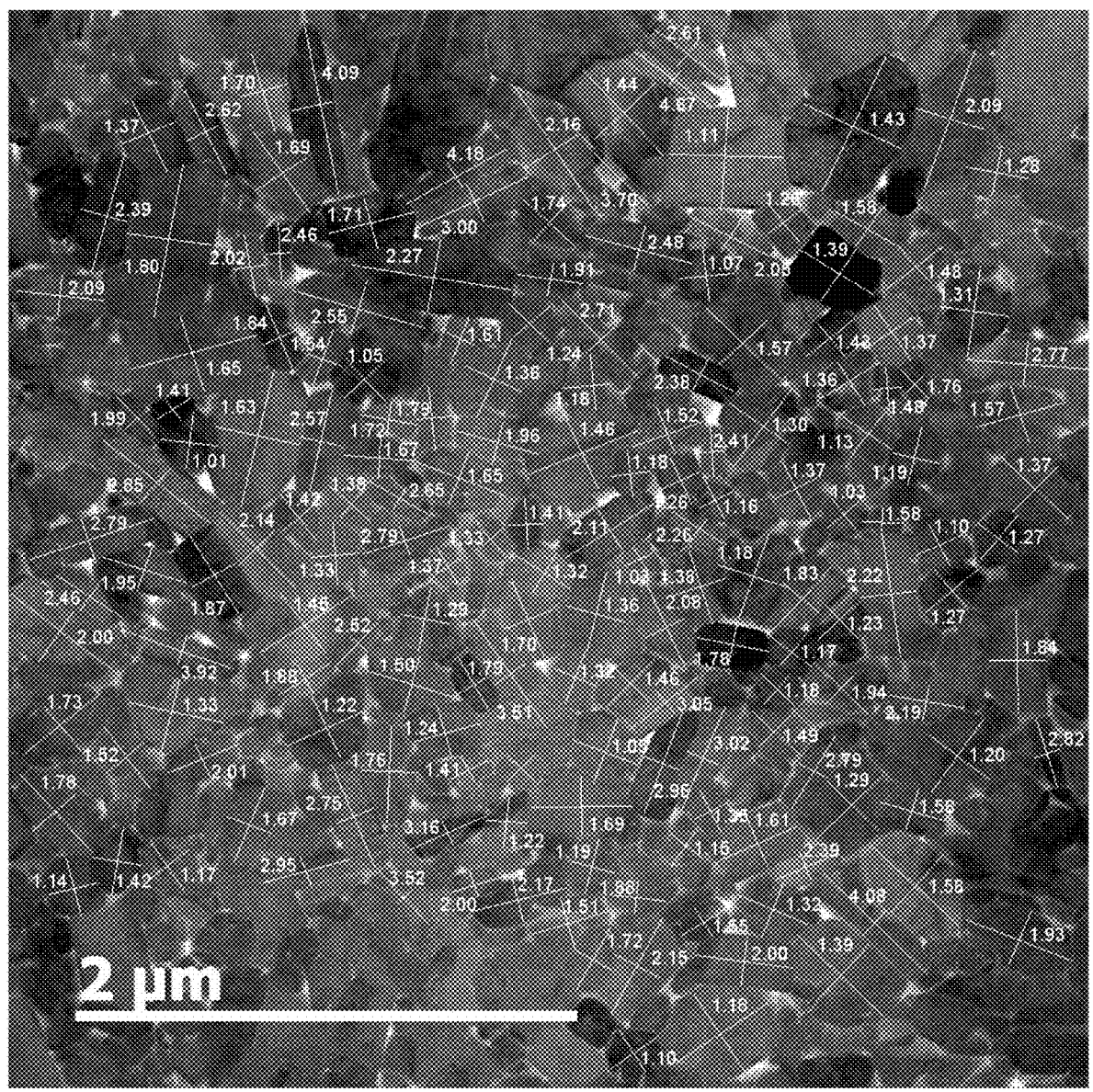
FIG. 14 is a cross-sectional TEM image showing the result of measuring the aspect ratio of primary particles in the core (second region) of the positive electrode active material according to Comparative Example 1.

FIG. 13 is a cross-sectional TEM image showing the result of measuring the aspect ratio of primary particles in the surface region (first region) of the positive electrode active material according to Comparative Example 1, and FIG. 14 is a cross-sectional TEM image showing the result of measuring the aspect ratio of primary particles in the core (second region) of the positive electrode active material according to Comparative Example 1.

Referring to FIGS. 8 to 12, the positive electrode active material according to Comparative Example 1 has an aspect ratio gradient increasing from the core of the secondary particle to the surface region of the secondary particle, and particularly, it can be confirmed that the shape of the primary particle present in the first region (the first, second and fourth sections) is a rod shape. In addition, referring to the results of measuring an aspect ratio shown in FIGS. 13 and 14, it can be confirmed that the increment in aspect ratio of the primary particles present in the first region compared with that present in the second region is excessively large, and the aspect ratio or sphericity of the primary particle present in the first region is lower than that of Example 1.

Figure 15:
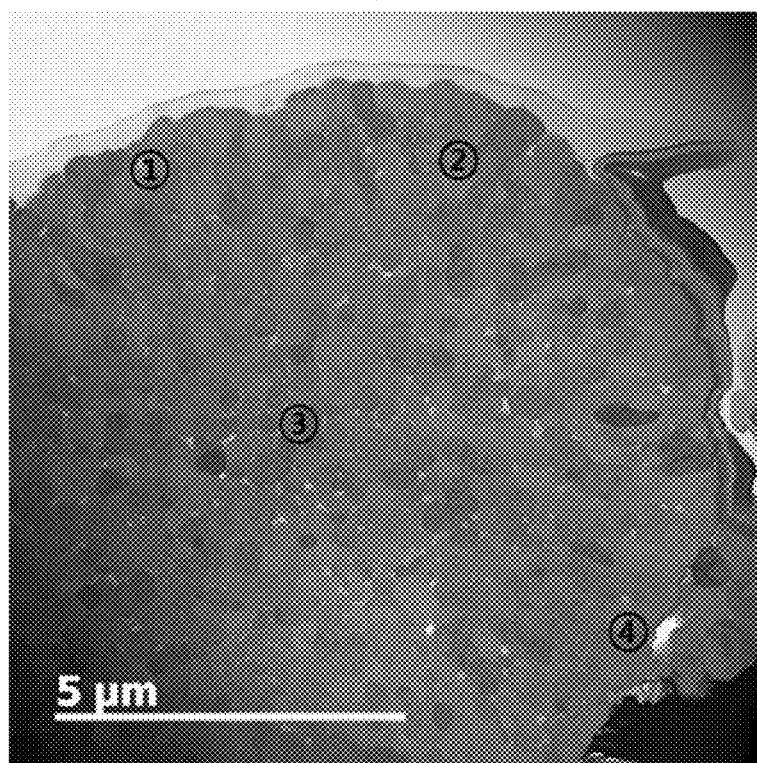
FIG. 15 is a cross-sectional TEM image of a positive electrode active material according to Comparative Example 2.
Figure 16:
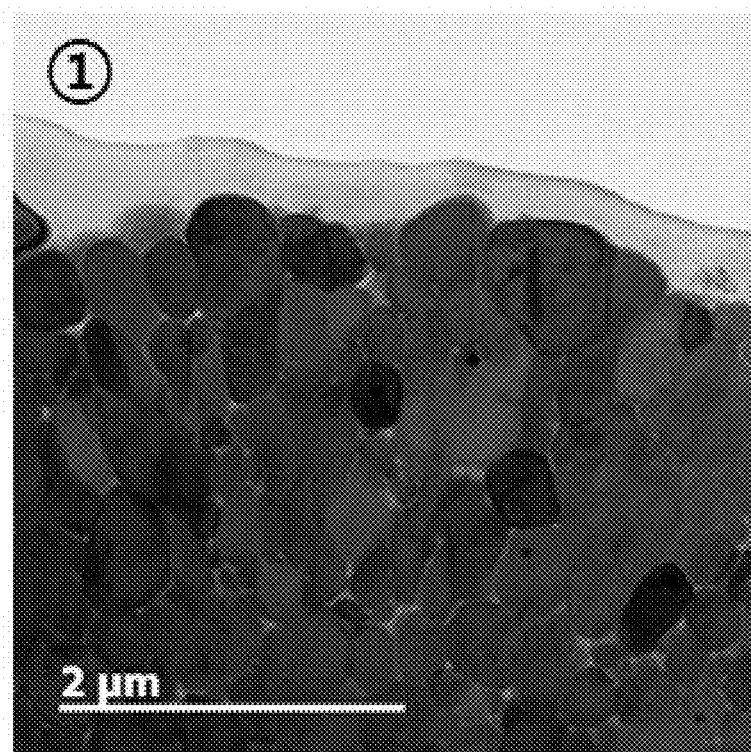
FIGS. 16 to 19 are partially enlarged images of the region shown in FIG. 15.
Figure 17:
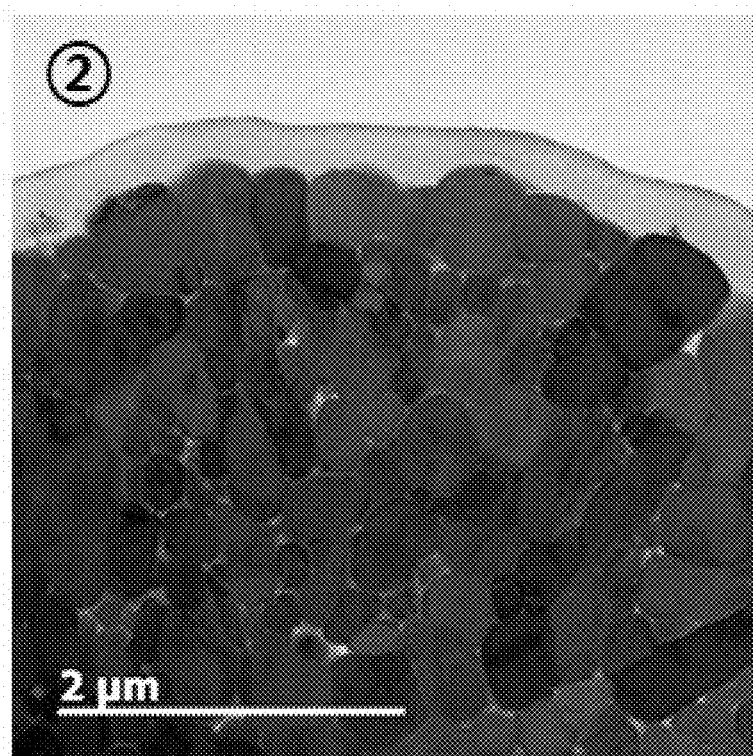
Figure 18:
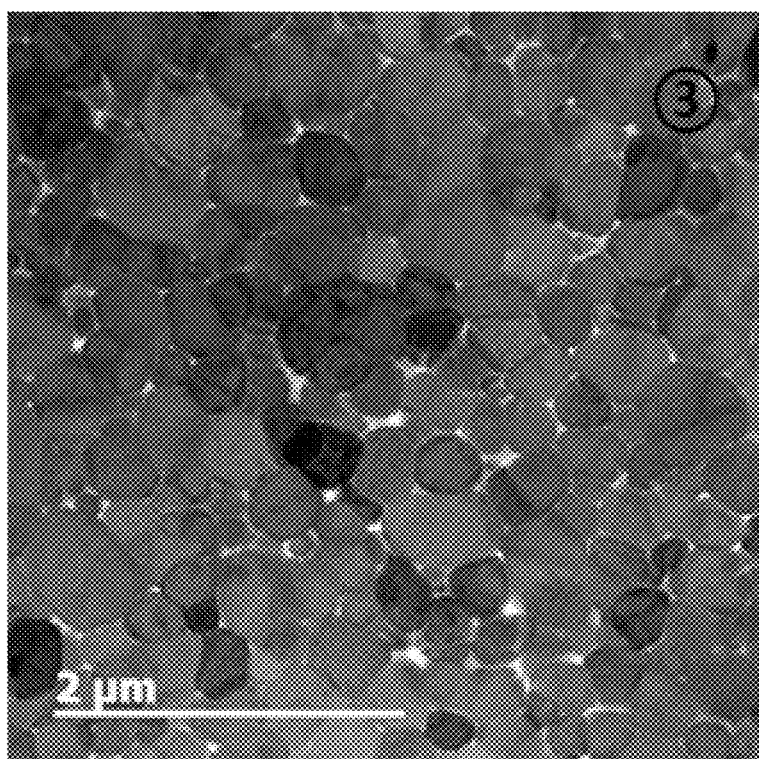
Figure 19:
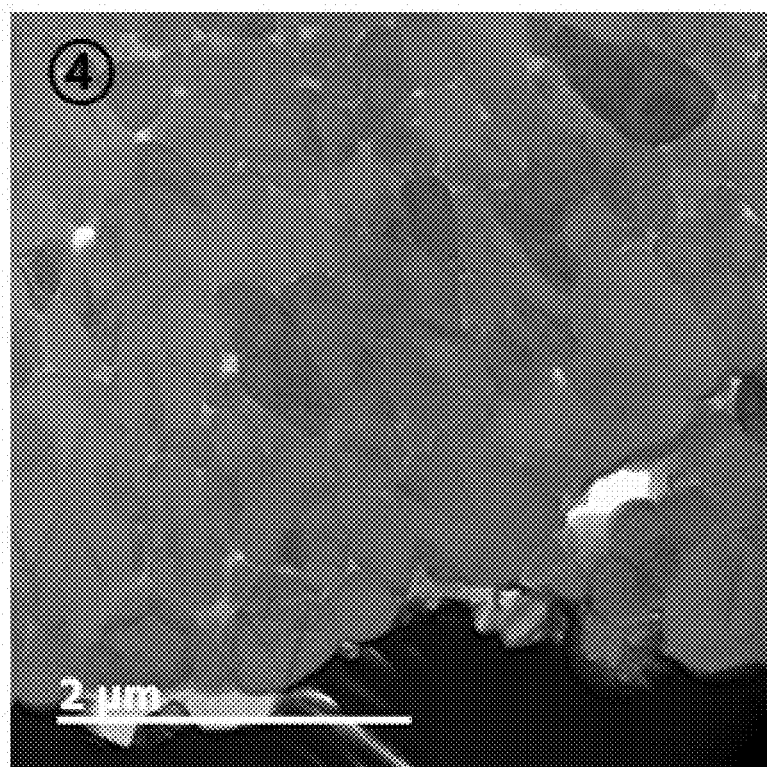

FIG. 15 is a cross-sectional TEM image of a positive electrode active material according to Comparative Example 2, and FIGS. 16 to 19 are partially enlarged images of the region shown in FIG. 15.

Figure 20:
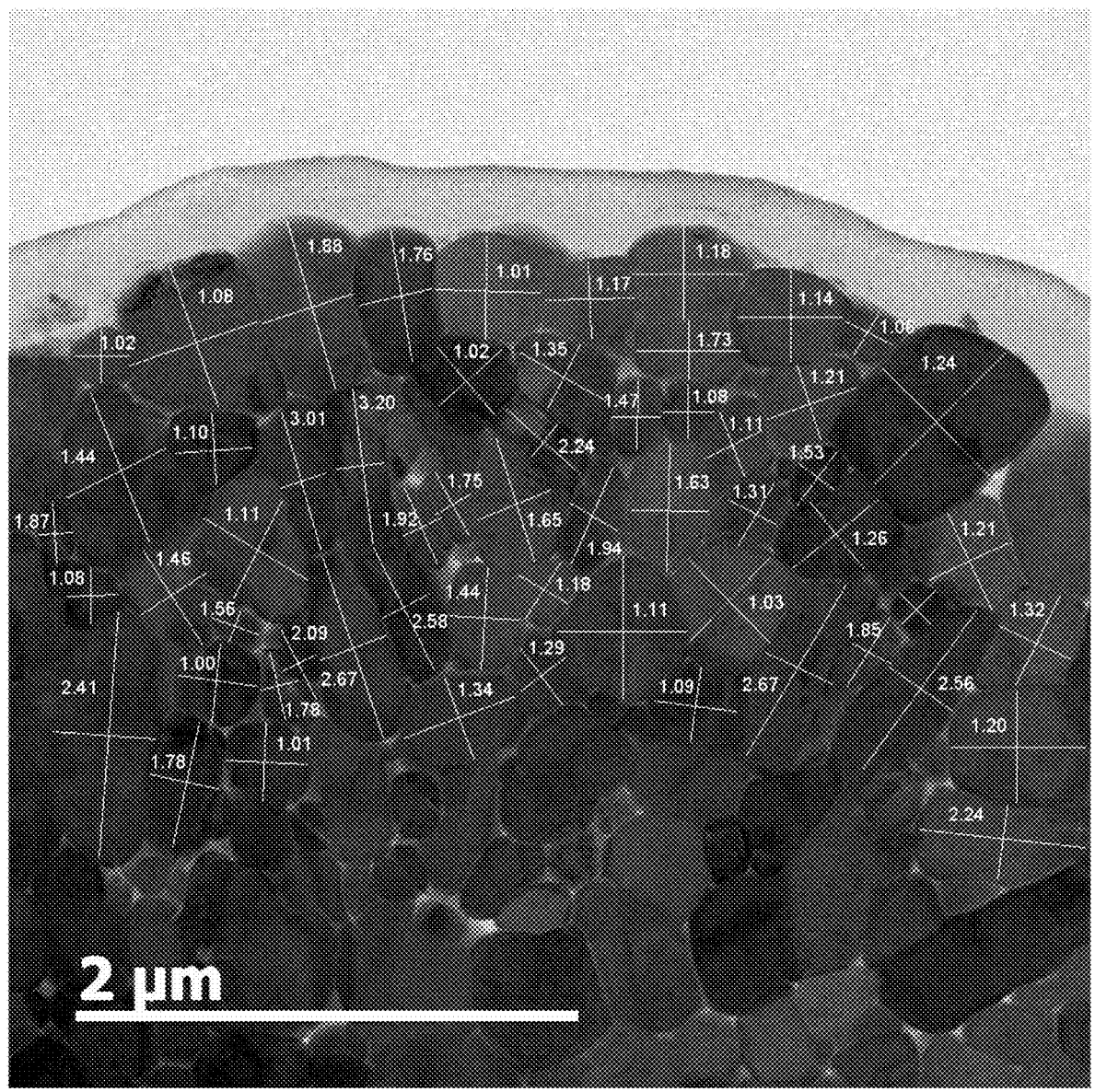
FIG. 20 is a cross-sectional TEM image showing the result of measuring the aspect ratio of primary particles in the surface region (first region) of the positive electrode active material according to Comparative Example 2.
Figure 21:
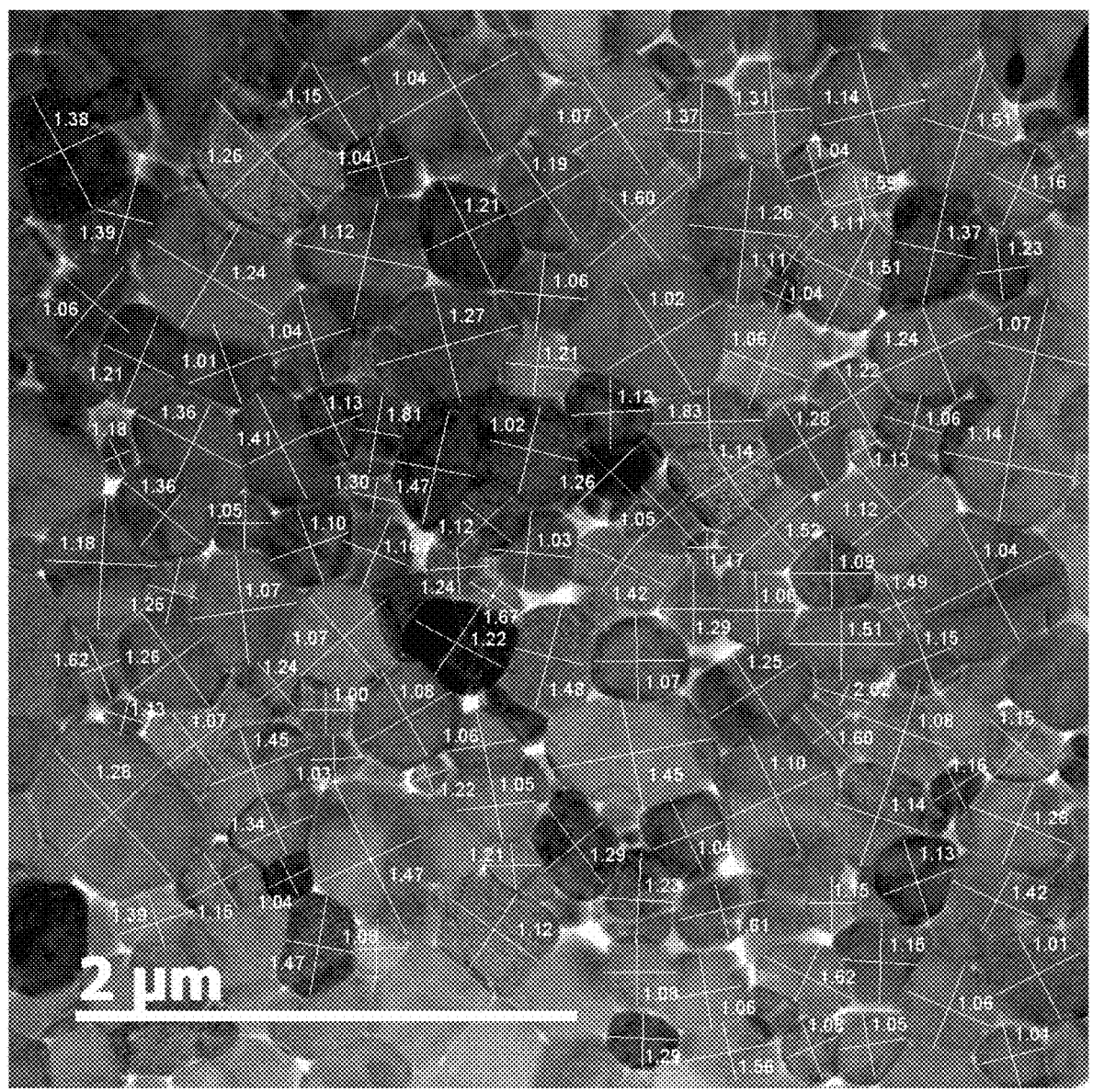
FIG. 21 shows a cross-sectional TEM image showing the result of measuring the aspect ratio of primary particles in the core (second region) of the positive electrode active material according to Comparative Example 2.

FIG. 20 is a cross-sectional TEM image showing the result of measuring the aspect ratio of primary particles in the surface region (first region) of the positive electrode active material according to Comparative Example 2, and FIG. 21 shows a cross-sectional TEM image showing the result of measuring the aspect ratio of primary particles in the core (second region) of the positive electrode active material according to Comparative Example 2.

Referring to FIGS. 15 to 19, it can be confirmed that the positive electrode active material according to Comparative Example 2 hardly exhibits an aspect ratio gradient increasing from the core of the secondary particle to the surface region of the secondary particle, and the shape of the primary particle present in the first region (the first, second and fourth sections) is almost similar to that of the primary particle present in the second region (the third section). These results can also be confirmed from the results of measuring an aspect ratio shown in FIGS. 20 and 21.

In the following Tables 1 and 2, the results of measuring the average aspect ratio ($W_1$) in the first region, the average aspect ratio ($W_2$) in the second region, the average aspect ratio ($W_3$) of first particles having a smaller aspect ratio than the average aspect ratio ($W_1$) among the primary particles in the first region, and the average aspect ratio ($W_4$) of primary particles having a larger aspect ratio than the average aspect ratio ($W_1$) among the primary particles in the first region of the positive electrode active material prepared according to the preparation example are shown. The average values are average values of the aspect ratios of at least 100 primary particles in respective regions.

$W_1$: the average aspect ratio of all primary particles in a first region (a region where the distance from the outermost surface of a positive electrode active material is 0 to 1 μm)

$W_2$: the average aspect ratio of all primary particles in a second region (a region where the distance from the core of a positive electrode active material is 0 to 2 μm)

$W_3$: the average aspect ratio of primary particles having a smaller aspect ratio than $W_1$ among primary particles in a first region

TABLE 1

| Classification | Example 1 | Example 2 | Example 3 |
| --- | --- | --- | --- |
| $W_1$ | 2.222 | 1.898 | 2.775 |
| $W_2$ | 1.478 | 1.401 | 1.642 |
| $W_1/W_2$ | 1.504 | 1.355 | 1.690 |
| $W_3$ | 1.596 | 1.400 | 1.998 |
| $W_3/W_2$ | 1.080 | 0.999 | 1.217 |
| $W_4$ | 3.043 | 2.717 | 3.897 |
| $W_4/W_2$ | 2.059 | 1.939 | 2.373 |
| P | 56.2% | 58.9% | 57.9% |

$W_4$: the average aspect ratio of primary particles having a larger aspect ratio than $W_1$ among primary particles in a first region P: the proportion of primary particles having a smaller aspect ratio than $W_1$ among primary particles in a first region

TABLE 2

| Classification | Comparative Example 1 | Comparative Example 2 | Comparative Example 3 | Comparative Example 4 | Comparative Example 5 | Comparative Example 6 |
| --- | --- | --- | --- | --- | --- | --- |
| $W_1$ | 4.083 | 1.569 | 3.855 | 1.912 | 1.746 | 1.618 |
| $W_2$ | 1.842 | 1.226 | 1.716 | 1.512 | 1.410 | 1.375 |
| $W_1/W_2$ | 2.217 | 1.280 | 2.247 | 1.265 | 1.238 | 1.177 |
| $W_3$ | 2.699 | 1.206 | 2.519 | 1.471 | 1.211 | 1.195 |
| $W_3/W_2$ | 1.465 | 0.984 | 1.468 | 0.973 | 0.859 | 0.869 |
| $W_4$ | 5.666 | 2.146 | 5.415 | 2.711 | 2.251 | 2.103 |
| $W_4/W_2$ | 3.076 | 1.750 | 3.156 | 1.793 | 1.596 | 1.529 |
| P | 44.7% | 61.3% | 42.9% | 64.7% | 59.2% | 60.5% |

Experimental Example 2. Evaluation of Battery Capacity and Lifetime Characteristics of Lithium Secondary Battery The lithium secondary battery manufactured according to Preparation Example 2 was subjected to a charging/discharging test using an electrochemical analyzer (Toyo, Toscat-3100) by applying a voltage range of 3.0V to 4.3V and a discharge rate of 0.2 C to 5.0 C at 25° C. to measure an initial charging capacity, an initial discharge capacity, initial reversible efficiency and rate characteristics.

In addition, the lithium secondary battery manufactured by the above-described method was charged/discharged for 50 cycles at 25° C. in a driving voltage range from 3.0V to 4.4V under the condition of 1 C/1 C, and then a ratio of the discharge capacity at the $50^{th}$ cycle relative to the initial capacity (capacity retention) was measured.

Among the results of the measured battery capacity and lifetime characteristics, the measurement results for the positive electrode active material having a precursor composition of $Ni_{0.8}Co_{0.1}Mn_{0.1}$ are shown in Tables 3 and 4 below, and the measurement results for the positive electrode active material having a precursor composition of $Ni_{0.94}Co_{0.03}Mn_{0.03}$ positive electrode active material are shown in Tables 5 and 6 below.

TABLE 3

| Classification | Initial charge capacity (mAh/g) | Initial discharge capacity (mAh/g) | Initial reversible efficiency (%) |
| --- | --- | --- | --- |
| Example 1 | 224.9 | 213.6 | 95.0 |
| Example 2 | 225.0 | 213.3 | 94.8 |
| Comparative Example 1 | 225.1 | 210.4 | 93.5 |
| Comparative Example 2 | 225.2 | 211.5 | 93.9 |
| Comparative Example 5 | 225.3 | 211.1 | 93.7 |
| Comparative Example 6 | 225.2 | 210.6 | 93.5 |

TABLE 4

| | Rate characteristics (%) | | | | | | Lifetime characteristics (%) |
| --- | --- | --- | --- | --- | --- | --- | --- |
| Classification | 0.2 C | 0.5 C | 1.0 C | 1.5 C | 2.0 | 5.0 C | 50 cy |
| Example 1 | 97.2 | 93.1 | 89.6 | 87.7 | 86.0 | 81.4 | 97.3 |
| Example 2 | 97.3 | 93.2 | 89.8 | 88.0 | 86.3 | 81.2 | 97.2 |
| Comparative Example 1 | 97.4 | 93.4 | 90.1 | 88.1 | 86.6 | 80.6 | 97.3 |
| Comparative Example 2 | 97.7 | 93.8 | 90.2 | 88.3 | 86.7 | 80.9 | 92.0 |
| Comparative Example 5 | 97.6 | 93.8 | 90.1 | 88.9 | 86.5 | 80.8 | 93.3 |
| Comparative Example 6 | 97.5 | 93.6 | 90.1 | 88.0 | 86.4 | 80.3 | 94.7 |

Referring to the results shown in Table 3, it can be confirmed that the positive electrode active materials according to Examples 1 and 2 in which a gradient range of the average aspect ratio of the primary particles present in the core of the secondary particle and the average aspect ratio of the primary particles present in the surface region of the secondary particle is adjusted exhibit excellent initial reversible efficiency, compared to the positive electrode active materials according to Comparative Example 1, Comparative Example 2, Comparative Example 5 and Comparative Example 6.

In addition, referring to the results of Table 4, it can be confirmed that, unlike the positive electrode active materials according to Comparative Example 2, Comparative Example 5 and Comparative Example 6 using an Nb-containing raw material, the positive electrode active materials according to Examples 1 and 2 exhibit a similar level of lifetime characteristics to that of the positive electrode active material according to Comparative Example 1 not containing an Nb-containing raw material in the process of preparing a positive electrode active material. That is, although being doped with a metal element such as niobium (Nb) in the positive electrode active material, the positive electrode active materials according to the examples of the present invention may maintain lifetime characteristics and improve capacity characteristics by adjusting a gradient of the average aspect ratio of primary particles in the secondary particle.

TABLE 5

| Classification | Initial charge capacity (mAh/g) | Initial discharge capacity (mAh/g) | Initial reversible efficiency (%) |
| --- | --- | --- | --- |
| Example 3 | 242.8 | 226.5 | 93.3 |
| Comparative Example 3 | 243.7 | 222.3 | 91.2 |
| Comparative Example 4 | 243.3 | 221.4 | 91.0 |

TABLE 6

| | Rate characteristics (%) | | | | | | Lifetime characteristics (%) |
| --- | --- | --- | --- | --- | --- | --- | --- |
| Classification | 0.2 C | 0.5 C | 1.0 C | 1.5 C | 2.0 | 5.0 C | 50 cy |
| Example 3 | 96.6 | 91.4 | 88.5 | 87.2 | 86.2 | 81.9 | 94.1 |
| Comparative Example 3 | 96.6 | 91.5 | 88.8 | 87.4 | 86.3 | 80.1 | 89.3 |
| Comparative Example 4 | 96.8 | 91.3 | 88.5 | 87.1 | 86.0 | 80.4 | 90.6 |

Overall, it can be confirmed that, since the positive electrode active material according to Example 3 uses a precursor with an $Ni_{0.94}Co_{0.03}Mn_{0.03}$ composition, the initial charging capacity of the positive electrode active material according to Example 3 is high. However, the positive electrode active material according to Example 3 has a low initial reversible capacity due to a higher initial irreversible capacity than that of the positive electrode active material of Example 1.

Meanwhile, referring to the results of Tables 5 and 6, it can be confirmed that the positive electrode active material according to Example 3 has excellent initial reversible capacity and lifetime characteristics, compared to the positive electrode active materials according to Comparative Examples 3 and 4 using a precursor with the same composition. Like the results shown in Tables 3 and 4, these results reveal that the positive electrode active materials according to the examples of the present invention maintain the lifetime characteristics and improve capacity characteristics by adjusting a gradient of the average aspect ratio of primary particles in the secondary particle although the positive electrode active material is doped with a metal element such as niobium (Nb).

Positive electrode active materials according to various embodiments of the present invention include primary particles enabling lithium intercalation/deintercalation and secondary particles in which the primary particles are aggregated, wherein the primary particles included in the secondary particle can improve the density of the primary particles in the secondary particle and electrochemical characteristics of the positive electrode active materials by adjusting a range of an aspect ratio gradient or sphericity gradient of the primary particles included in the secondary particle.

Particularly, when a metal element such as niobium (Nb) is doped in the positive electrode active material, lifetime characteristics are probably reduced, but when a gradient range of the average aspect ratio of the primary particles present in the secondary particle and the average aspect ratio of the primary particles present in the surface region of the secondary particle is adjusted, a decrease in lifetime characteristics of the positive electrode active material can be minimized, and other electrochemical characteristics (e.g., charge capacity, efficiency, output, etc.) can also be improved.

In addition, the primary particles included in the positive electrode active materials according to various embodiments of the present invention can exhibit an aspect ratio gradient increasing from the core to the surface region of the secondary particle, but the size of the aspect ratio gradient can be determined within a range in which the sphericity of the primary particles present in the surface region of the secondary particle is not greatly harmed. Therefore, the primary particles present in the surface region of the secondary particle have a shape close to the shape of the primary particles present in the core of the secondary particle, rather than a rod shape.

Accordingly, the density of the primary particles in the positive electrode active material can be improved, and a partial strain caused by asymmetric volume expansion of the positive electrode active material can be effectively reduced during the charging/discharging of a lithium secondary battery using the positive electrode active material. Such a decrease in strain can reduce cracking after the lifetime of the positive electrode active material. As a result, the lifetime and stability of a lithium secondary battery can be improved.

Above, while the embodiments of the present invention have been described, it will be understood by those of ordinary skill in the art that the present invention may be changed and modified in various ways by addition, alternation, or deletion of components without departing from the spirit of the present invention defined in the appended claims.

What is claimed is:

1. A positive electrode active material, comprising:
   primary particles enabling lithium intercalation/deintercalation and secondary particles in which the primary particles are aggregated,
   wherein the average aspect ratio of the primary particles has a gradient increasing from the core of the secondary particle to the surface region of the secondary particle,
   wherein when a distance from the core to the surface region of the secondary particle is R, a region where the distance from the core of the secondary particle is 4/5R to R is a first region ($R_1$), and a region where the distance from the core of the secondary particle is 0 to 2/5R is a second region ($R_2$),
   a ratio ($W_1/W_2$) of the average aspect ratio ($W_1$) of all primary particles in the first region and the average aspect ratio ($W_2$) of all primary particles in the second region is less than 2.217, and
   wherein the primary particles comprise niobium (Nb) as a metal dopant.

2. The positive electrode active material of claim 1, wherein the ratio ($W_1/W_2$) of the average aspect ratio ($W_1$) and the average aspect ratio ($W_2$) is more than 1.280.

3. The positive electrode active material of claim 1, wherein the proportion of primary particles having a smaller aspect ratio than the average aspect ratio ($W_1$) among the primary particles in the first region is 45% or more.

4. The positive electrode active material of claim 3, wherein a ratio ($W_3/W_2$) of the average aspect ratio ($W_3$) of primary particles having a smaller aspect ratio than the average aspect ratio ($W_1$) among the primary particles in the first region and the average aspect ratio ($W_2$) is more than 0.984 and less than 1.465.

5. The positive electrode active material of claim 3, wherein a ratio ($W_4/W_2$) of the average aspect ratio ($W_4$) of the primary particles having a higher aspect ratio than the average aspect ratio ($W_1$) among the primary particles in the first region and the average aspect ratio ($W_2$) is more than 1.793 and less than 3.076.

6. The positive electrode active material of claim 1, wherein the average aspect ratio ($W_2$) is less than 4.083.

7. The positive electrode active material of claim 1, wherein the average aspect ratio ($W_2$) is less than 1.842.

8. The positive electrode active material of claim 1, wherein the primary particle is represented by Formula 1 below:

[Formula 1]

$$Li_wNi_{1-(x+y+z+z')}Co_xM1_yM2_zNb_{z'}O_2 \qquad \text{[Formula 1]}$$
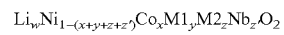

(Here, M1 is at least one selected from Mn and Al,
M2 is at least one selected from P, Sr, Ba, B, Ti, Zr, Mn, Al, W, Ce, Hf, Ta, Cr, F, Mg, Cr, V, Fe, Zn, Si, Y, Ga, Sn, Mo, Ge, Nd, Gd and Cu,
M1 and M2 are different elements, and
$0.5 \le w \le 1.5$, $0 \le x \le 0.50$, $0 \le y \le 0.20$, $0 \le z \le 0.20$, $0 < z' \le 0.20$).

9. The positive electrode active material of claim 8, wherein the higher the z' value, the lower the ratio ($W_1/W_2$) of the average aspect ratio ($W_1$) and the average aspect ratio ($W_2$).

10. The positive electrode active material of claim 1, further comprising:
    a coating layer covering at least a part of the interface between the primary particles and the surface of the secondary particle,
    wherein the coating layer comprises at least one oxide represented by Formula 2 below:

[Formula 2]

$$Li_aM3_bO_c \qquad \text{[Formula 2]}$$

(Here, M3 is at least one selected from Ni, Mn, Co, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Ce, Gd and Nd, and $0 \le a \le 10$, $0 \le b \le 8$, and $2 \le c \le 13$).

11. A positive electrode comprising the positive electrode active material according to claim 1.

12. A lithium secondary battery using the positive electrode of claim 11.

* * * * *